United States Patent
Nakagawa et al.

(10) Patent No.: US 9,123,169 B2
(45) Date of Patent: Sep. 1, 2015

(54) MODEL GENERATION METHOD AND MODEL GENERATION APPARATUS

(71) Applicants: FUJITSU LIMITED, Kawasaki-shi, Kanagawa (JP); The University of Tokyo, Tokyo (JP)

(72) Inventors: Machiko Nakagawa, Kawasaki (JP); Toshiaki Hisada, Tokyo (JP); Seiryo Sugiura, Tokyo (JP); Takumi Washio, Tokyo (JP); Jun-ichi Okada, Tokyo (JP)

(73) Assignees: FUJITSU LIMITED, Kawasaki (JP); The University of Tokyo, Tokyo (JP)

( * ) Notice: Subject to any disclaimer, the term of this patent is extended or adjusted under 35 U.S.C. 154(b) by 253 days.

(21) Appl. No.: 13/934,859

(22) Filed: Jul. 3, 2013

(65) Prior Publication Data

US 2014/0022253 A1      Jan. 23, 2014

(30) Foreign Application Priority Data

Jul. 18, 2012   (JP) ................................ 2012-159660

(51) Int. Cl.
*G06T 15/10* (2011.01)
*G06T 19/20* (2011.01)
*G06T 7/00* (2006.01)

(52) U.S. Cl.
CPC ............... *G06T 19/20* (2013.01); *G06T 7/0032* (2013.01); *G06T 2200/04* (2013.01); *G06T 2207/10072* (2013.01); *G06T 2207/30048* (2013.01)

(58) Field of Classification Search
None
See application file for complete search history.

(56) References Cited

U.S. PATENT DOCUMENTS

| 7,155,042 B1 * | 12/2006 | Cowan et al. ................. 382/128 |
| 8,554,573 B2 * | 10/2013 | Pekar et al. ...................... 705/2 |
| 2011/0235883 A1 * | 9/2011 | Nakagawa et al. ........... 382/131 |

FOREIGN PATENT DOCUMENTS

JP        2011-200549        10/2011

* cited by examiner

Primary Examiner — Kee M Tung
Assistant Examiner — Frank Chen
(74) Attorney, Agent, or Firm — Oblon, McClelland, Maier & Neustadt, L.L.P.

(57) ABSTRACT

A computer sets a first point on a first part in a plurality of tomographic images of an organ. The computer determines a relative position of the first point with respect to reference positions of the first part and a second part in the tomographic images. The computer sets a second point in association with the first point, on the first part in a 3D model representing a structure of the organ, such that a relative position of the second point with respect to reference positions of the first part and the second part in the 3D model matches the relative position of the first point. Then, the computer deforms the 3D model such that, when the tomographic images and the 3D model are placed in the same coordinate system, the position of the second point matches that of the first point.

10 Claims, 21 Drawing Sheets

FIG. 4
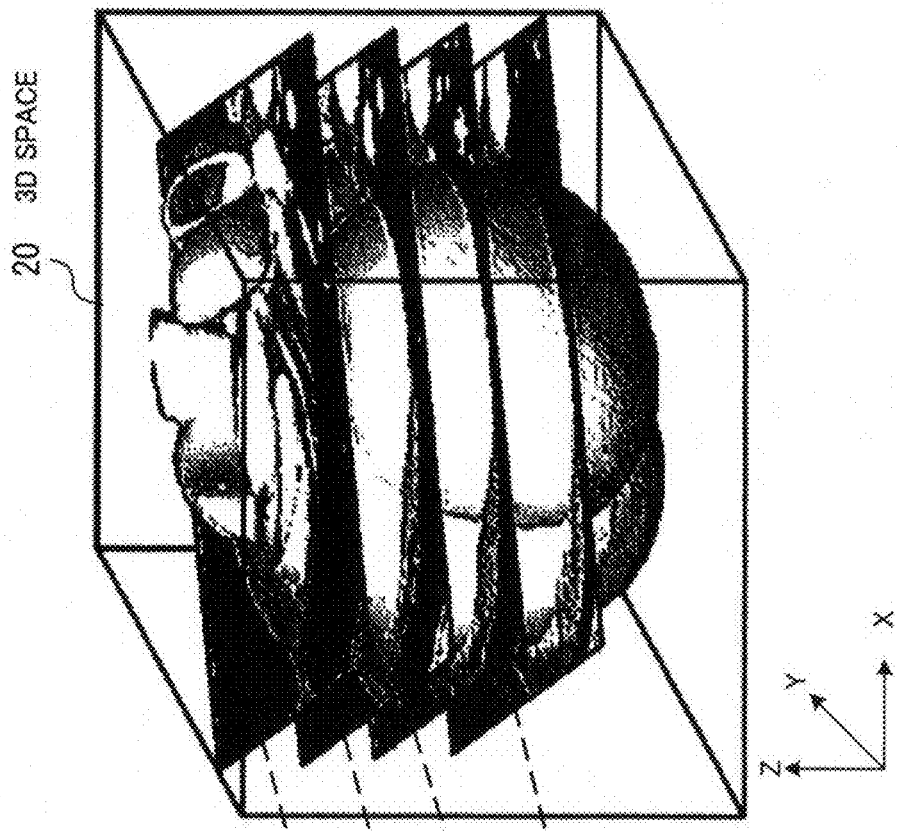
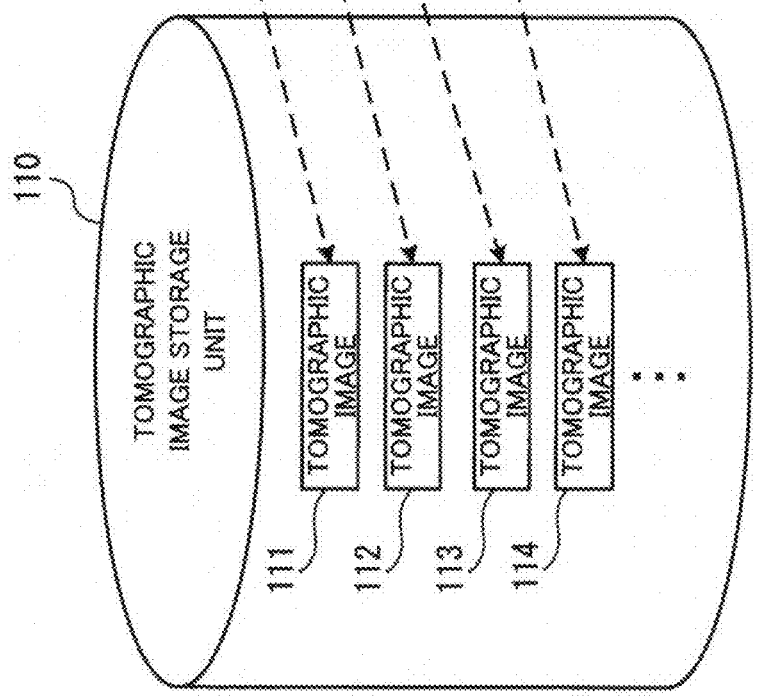

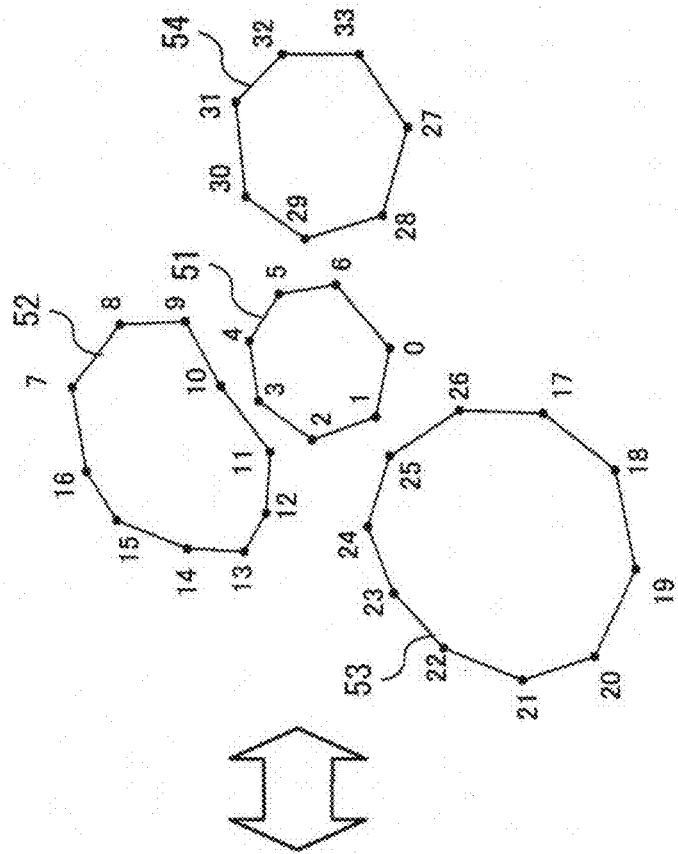
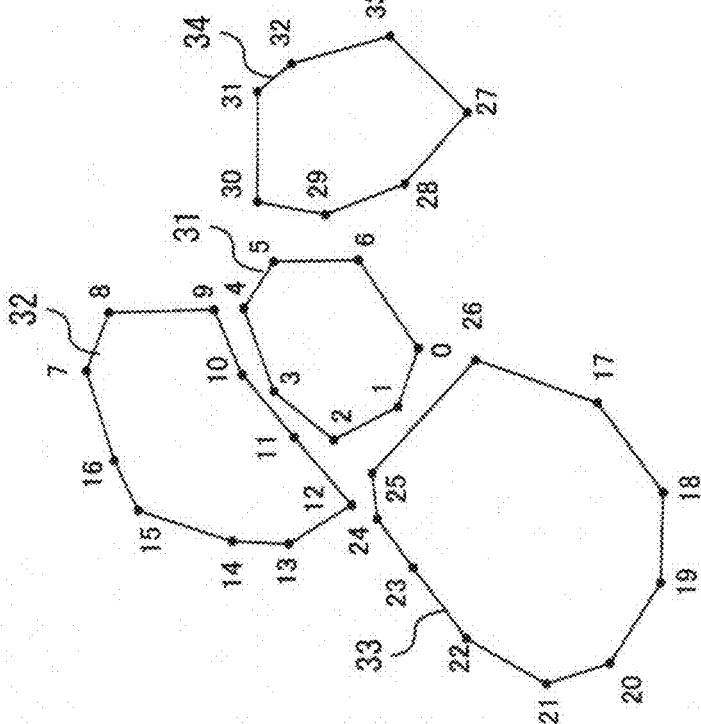

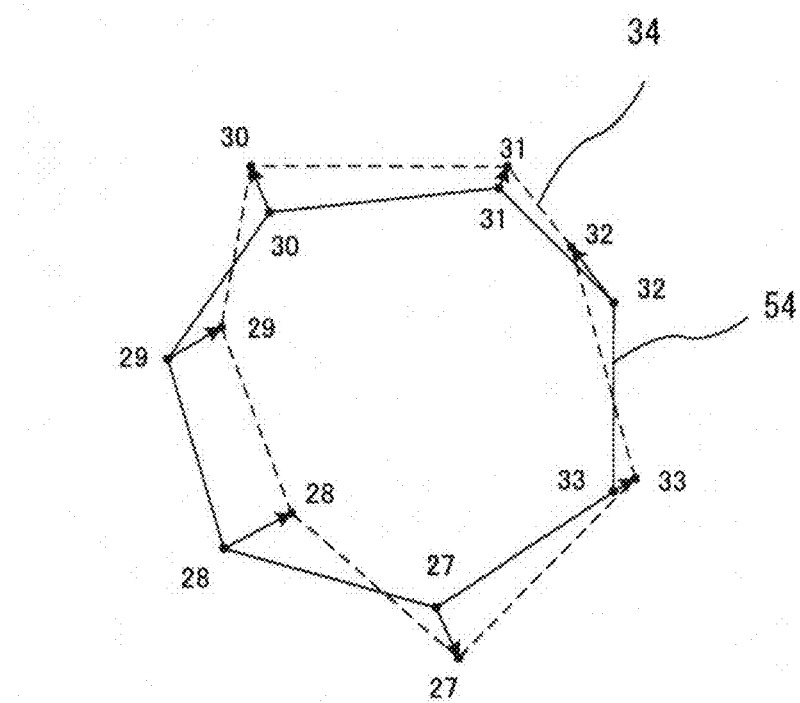

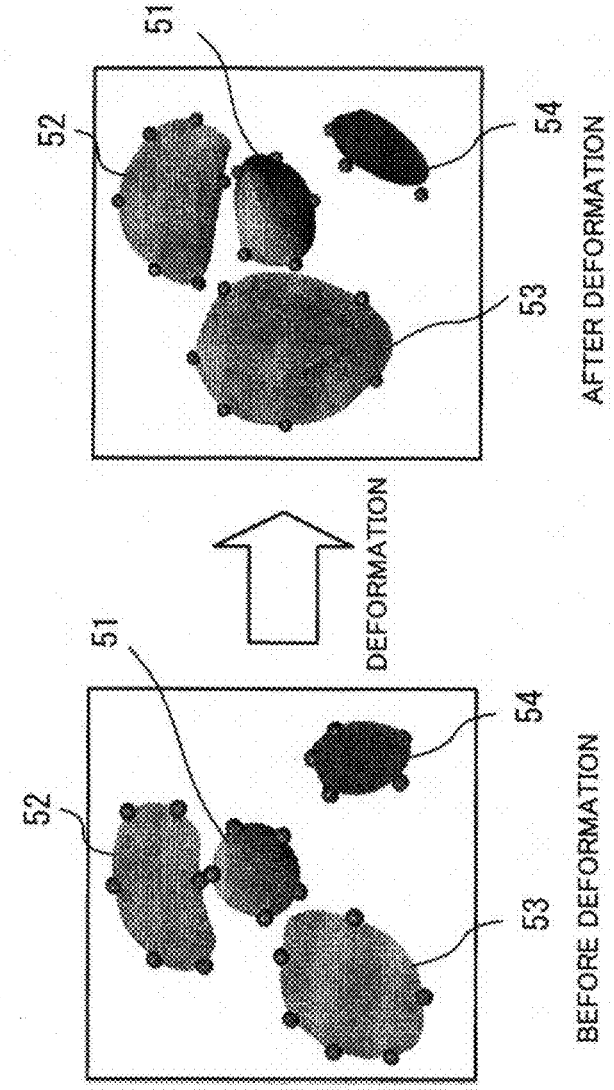

MODEL GENERATION METHOD AND MODEL GENERATION APPARATUS

CROSS-REFERENCE TO RELATED APPLICATION

This application is based upon and claims the benefit of priority of the prior Japanese Patent Application No. 2012-159660, filed on Jul. 18, 2012, the entire contents of which are incorporated herein by reference.

FIELD

The embodiments discussed herein relate to a model generation method and a model generation apparatus.

BACKGROUND

In recent years, simulation of biological systems has been attracting attention. As an example of simulation of biological systems, simulation of the motion of organs such as the heart is often performed. In this case, a model of the organ is generated as input data. For simulating an organ of an individual patient, a model conforming to the shape of the organ of the patient is generated. However, since it is difficult to directly view the organ of the patient, the shape of the organ is determined from tomographic images of the organ, for example. Then, a three-dimensional (3D) model is generated on the basis of the determined shape. For instance, a 3D template deformation method has been disclosed that facilitates generation of a 3D shape model of the heart of a patient and blood vessels around the heart (see, for example, Japanese Laid-open Patent Publication No. 2011-200549).

However, it is difficult to accurately reproduce the shape of an organ as a 3D model from tomographic images of the organ.

For example, it is assumed that a 3D model of the heart of a patient is generated by deforming a 3D model which is prepared as a template of the shape of the heart. In this case, in a first deformation process, the position of a valve annulus (the frame of a valve) in the template is adjusted to match the shape of the heart. The first deformation process greatly affects the subsequent deformation process, and therefore needs to be performed accurately. According to a conventional method, in the case of matching the position of a valve annulus in the template to the shape of the heart of a patient, points are manually set in the template so as to correspond to respective points on a valve annulus in tomographic images of the heart. Then, the template is deformed such that the points in the template match the corresponding points on the valve annulus in the tomographic images. However, since the points in the template corresponding to the points on the valve annulus in the tomographic images are set manually, the relative positional relationship between, for example, valve annuli might be inconsistent in three dimensions, and therefore the deformed model might be distorted.

SUMMARY

According to one aspect of the invention, there is provided a computer-readable storage medium storing a computer program which causes a computer to perform a procedure including: setting a first point on a first part represented in a plurality of tomographic images of an organ; determining a relative position of the first point with respect to a reference position of the first part represented in the plurality of tomographic images and a reference position of a second part represented in the plurality of tomographic images; setting a second point in association with the first point, on a first part in a 3D model representing a structure of the organ, such that a relative position of the second point with respect to a reference position of the first part in the 3D model and a reference position of a second part in the 3D model matches the relative position of the first point; and deforming the 3D model such that, when the plurality of tomographic images and the 3D model are placed in a same coordinate system, a position of the second point matches a position of the first point corresponding to the second point.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 illustrates exemplary tomographic images of the heart;

FIG. 15 illustrates exemplary source landmarks that are set in association with target landmarks;

FIG. 16 illustrates an example of a deformation process based on landmarks;

FIG. 17 illustrates an example of deforming a template model based on landmarks;

DESCRIPTION OF EMBODIMENTS

Figure 1:
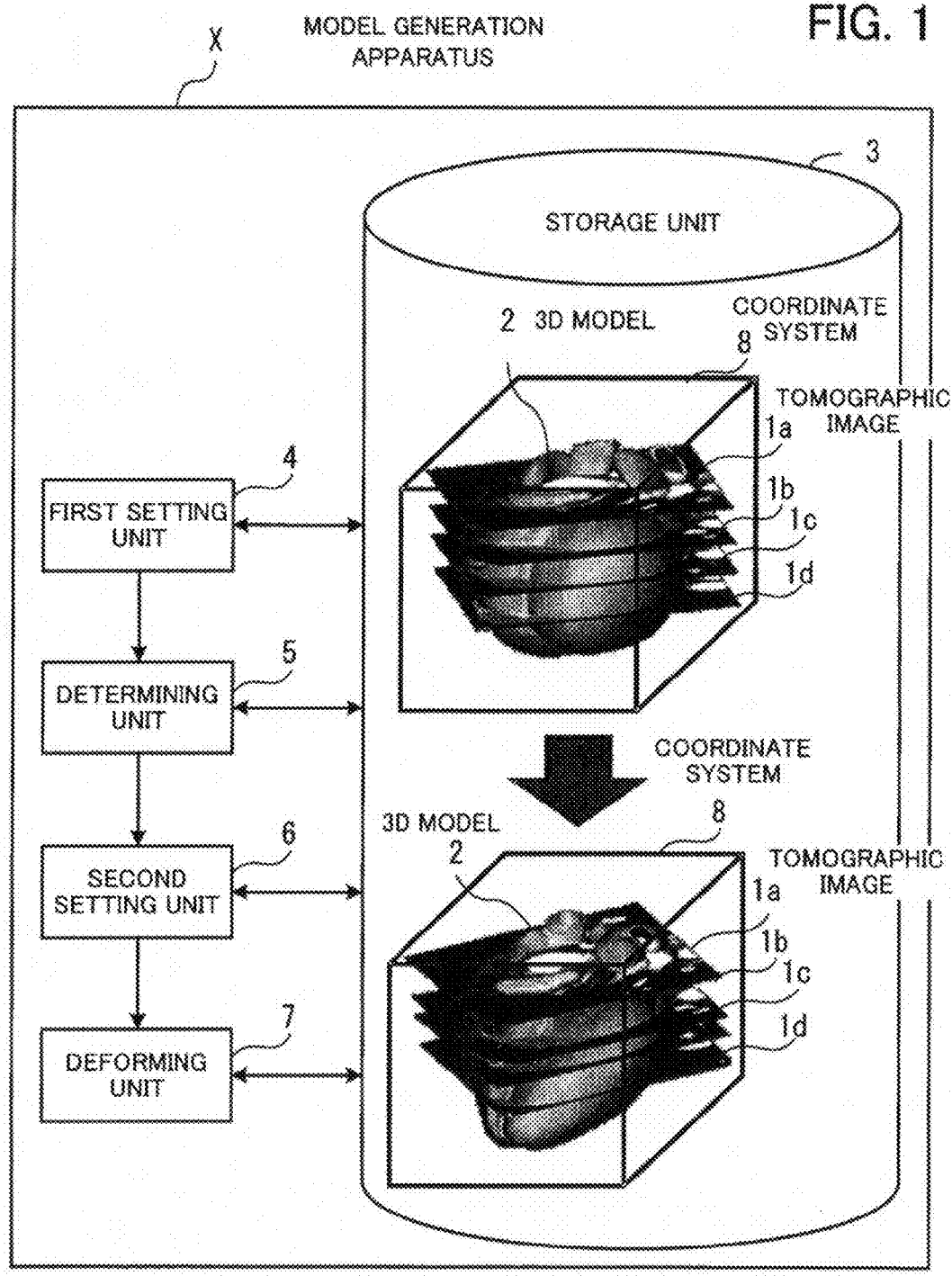
FIG. 1 illustrates an exemplary functional configuration of a model generation apparatus according to a first embodiment.

Embodiments will be described below with reference to the accompanying drawings, wherein like reference numerals refer to like elements throughout. Features described in association with different embodiments may be combined without departing from the scope of the disclosure.

(a) First Embodiment

First, a description will be given of a first embodiment. According to the first embodiment, there is provided a model generation apparatus that generates an accurate 3D model of an organ of a living organism.

FIG. 1 illustrates an exemplary functional configuration of a model generation apparatus X according to the first embodiment. The model generation apparatus X includes a storage unit 3, a first setting unit 4, a determining unit 5, a second setting unit 6, and a deforming unit 7.

The storage unit 3 stores a plurality of tomographic images 1a, 1b, 1c, and 1d of an organ, and a three-dimensional (3D) model 2 representing the structure of the organ. The organ may be the heart, for example.

The first setting unit 4 sets a first point on a first part represented in the plurality of tomographic images 1a, 1b, 1c, and 1d. The first part may be, for example, the annulus of a heart valve. For instance, the first setting unit 4 sets, as a first point, a point in the tomographic images specified by an input from the user. Note that a plurality of first points may be set.

The determining unit 5 determines a relative position of the first point with respect to a reference position of the first part represented in the plurality of tomographic images 1a, 1b, 1c, and 1d and a reference position of a second part represented in the plurality of tomographic images 1a, 1b, 1c, and 1d. The second part may be, for example, one of the annuli of heart valves other than the first part. For instance, if the first part is the mitral valve annulus, the second part may be the aortic valve annulus. For instance, the determining unit 5 generates a line connecting the reference position of the first part represented in the plurality of tomographic images 1a, 1b, 1c, and 1d and the reference position of the second part represented in the plurality of tomographic images 1a, 1b, 1c, and 1d, and a line connecting the reference position of the first part and the first point. Then, the determining unit 5 represents the relative position of the first point in terms of the angle formed by the generated two lines. The reference positions of the first and second parts may be their centers of gravity, for example.

The second setting unit 6 sets a second point in association with the first point, on a first part in the 3D model 2. In this step, the second setting unit 6 sets the second point such that the relative position thereof with respect to a reference position of the first part in the 3D model 2, which represents the structure of the organ, and with respect to a reference position of a second part in the 3D model 2 matches the relative position of the first point. For example, the second setting unit 6 generates a line connecting the reference position of the first part in the 3D model 2 and the reference position of the second part in the 3D model 2, and a line connecting the reference position of the first part in the 3D model 2 and the second point. Then, the second setting unit 6 sets the second point corresponding to the first point, at a position on the first part in the 3D model 2, such that the angle formed by the generated two lines is equal to the angle representing the relative position of the first point.

The deforming unit 7 deforms the 3D model 2 such that, when the plurality of tomographic images 1a, 1b, 1c, and 1d and the 3D model 2 are placed in a same coordinate system 8, the position of the second point matches the position of the first point corresponding to the second point.

According to this model generation apparatus X, the first setting unit 4 sets the first point on the first part represented in the plurality of tomographic images 1a, 1b, 1c, and 1d. Then, the determining unit 5 determines the relative position of the first point. Then, the second setting unit 6 sets the second point in association with the first point, on the first part in the 3D model 2, such that the relative position of the second point matches the relative position of the first point. Then, the deforming unit 7 deforms the 3D model 2 such that the position of the second point matches the position of the first point corresponding to the second point.

In this way, the model generation apparatus X sets the second point on the basis of the relative position thereof with respect to the first part and the second part. Therefore, the first part and the second part in the deformed 3D model 2 have an accurate relative positional relationship. This prevents the deformed 3D model 2 from being distorted. That is, it is possible to accurately reproduce, as a 3D model, the shape of the organ represented in the tomographic images.

Note that the first setting unit 4, the determining unit 5, the second setting unit 6, and the deforming unit 7 may be realized as a central processing unit (CPU) of the model generation apparatus X. Further, the storage unit 3 may be realized as a random access memory (RAM) or a hard disk drive (HDD) of the model generation apparatus X.

The lines connecting the elements in FIG. 1 represent some of communication paths. Communication paths other than those of FIG. 1 may be provided.

(b) Second Embodiment

Next, a description will be given of a second embodiment. According to the second embodiment, a 3D model is generated on the basis of tomographic images of the heart.

Figure 2:
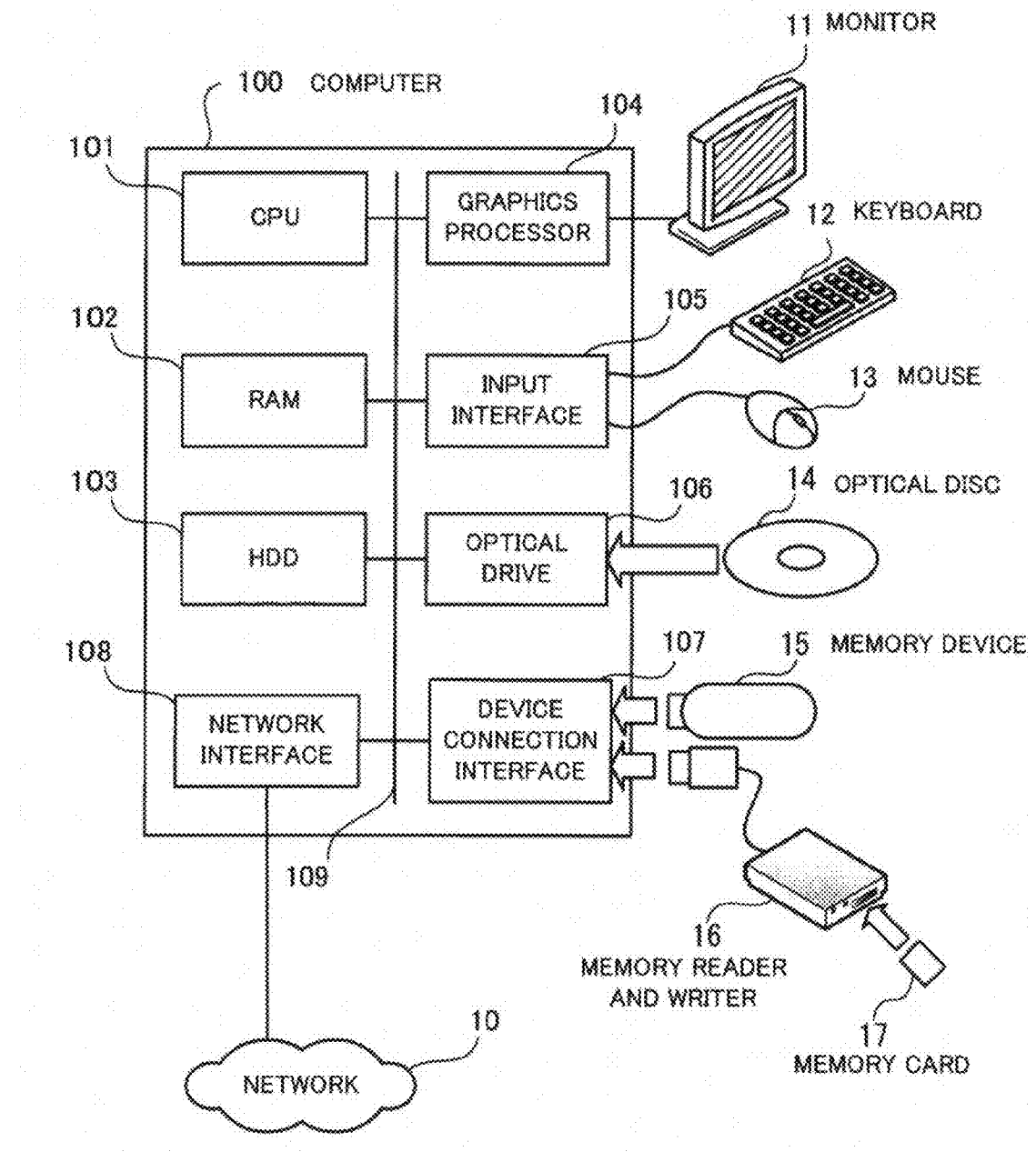
FIG. 2 illustrates an exemplary hardware configuration of a computer used in the first embodiment.

FIG. 2 illustrates an exemplary hardware configuration of a computer 100 used in the present embodiment. The entire operation of the computer 100 is controlled by a CPU 101. A RAM 102 and a plurality of peripheral devices are connected to the CPU 101 via a bus 109. Although the computer 100 includes only one CPU in this embodiment, the computer 100 may include a plurality of CPUs. In the case where the computer 100 includes a plurality of CPUs, the plurality of CPUs operate in combination with each other so as to control the entire operation of the computer 100.

The RAM 102 serves as a primary storage device of the computer 100. The RAM 102 temporarily stores at least part of the operating system (OS) and application programs that are executed by the CPU 101. The RAM 102 also stores various types of data that are used in processing performed by the CPU 101.

The peripheral devices connected to the bus 109 include an HDD 103, a graphics processor 104, an input interface 105, an optical drive 106, a device connection interface 107, and a network interface 108.

The HDD 103 magnetically writes data to and reads data from an internal disk. The HDD 103 serves as a secondary storage device of the computer 100. The HDD 103 stores the OS, application programs, and various types of data. Note that semiconductor storage device such as a flash memory may be used as a secondary storage device.

A monitor 11 is connected to the graphics processor 104. The graphics processor 104 displays an image on the screen of the monitor 11 in accordance with a command from the CPU 101. Examples of the monitor 11 include a display device using a cathode ray tube (CRT) and a liquid crystal display device.

A keyboard 12 and a mouse 13 are connected to the input interface 105. The input interface 105 receives signals from the keyboard 12 and the mouse 13, and transmits the received signals to the CPU 101. The mouse 13 is an example of a pointing device, and other types of pointing devices may also be used. Examples of other types of pointing devices include a touch panel, a tablet, a touch pad, a track ball, and the like.

The optical drive 106 reads data from an optical disc 14 by using laser beams or the like. The optical disc 14 is a portable storage medium, and data stored therein may be read through optical reflection. Examples of the optical disc 14 include digital versatile disc (DVD), DVD-RAM, compact disc read only memory (CD-ROM), CD-Recordable (CD-R), and CD-Rewritable (CD-RW).

The device connection interface 107 is a communication interface that connects peripheral devices to the computer 100. For example, a memory device 15 and a memory reader and writer 16 may be connected to the device connection interface 107. The memory device 15 is a recording medium having a function to communicate with the device connection interface 107. The memory reader and writer 16 is a device that writes data to and reads data from a memory card 17. The memory card 17 is a card-type recording medium.

The network interface 108 is connected to a network 10. The network interface 108 exchanges data with other computers or communication apparatuses via the network 10.

With the hardware configuration described above, it is possible to realize the processing functions of the second embodiment. Note that, with a hardware configuration similar to that of the computer 100 of FIG. 2, it is possible to realize the model generation apparatus X of the first embodiment.

The computer 100 realizes the processing functions of the second embodiment by executing a model generation program stored in a computer-readable recording medium. The model generation program describing the procedure to be performed by the computer 100 may be stored in various recording media. For example, the program to be executed by the computer 100 may be stored in the HDD 103. The CPU 101 loads at least part of the program from the HDD 103 into the RAM 102 so as to execute the program. The program to be executed by the computer 100 may be stored in a portable recording medium such as the optical disc 14, the memory device 15, the memory card 17, and the like. The program stored in the portable recording medium may be executed after being installed into the HDD 103 under the control of the CPU 101, for example. Further, the CPU 101 may execute the program by reading the program directly from the portable recording medium. Note that the computer-readable recording medium storing the program does not include transitory propagating signals per se.

In the case of distributing the program, portable storage media, such as the optical disc 14, the memory device 15, the memory card 17, and the like, in which the program is stored may be sold, for example. Further, the program may be stored in a storage device of a server computer so as to be transmitted from another server computer to the computer 100 via the network 10. The computer 100 having received the program via the network stores the received program in the HDD 103, for example. Then, the CPU 101 of the computer 100 executes the program stored in the HDD 103. Also, every time the computer 100 receives a part of the program from the server computer, the computer 100 may perform processing in accordance with the received program.

Figure 3:
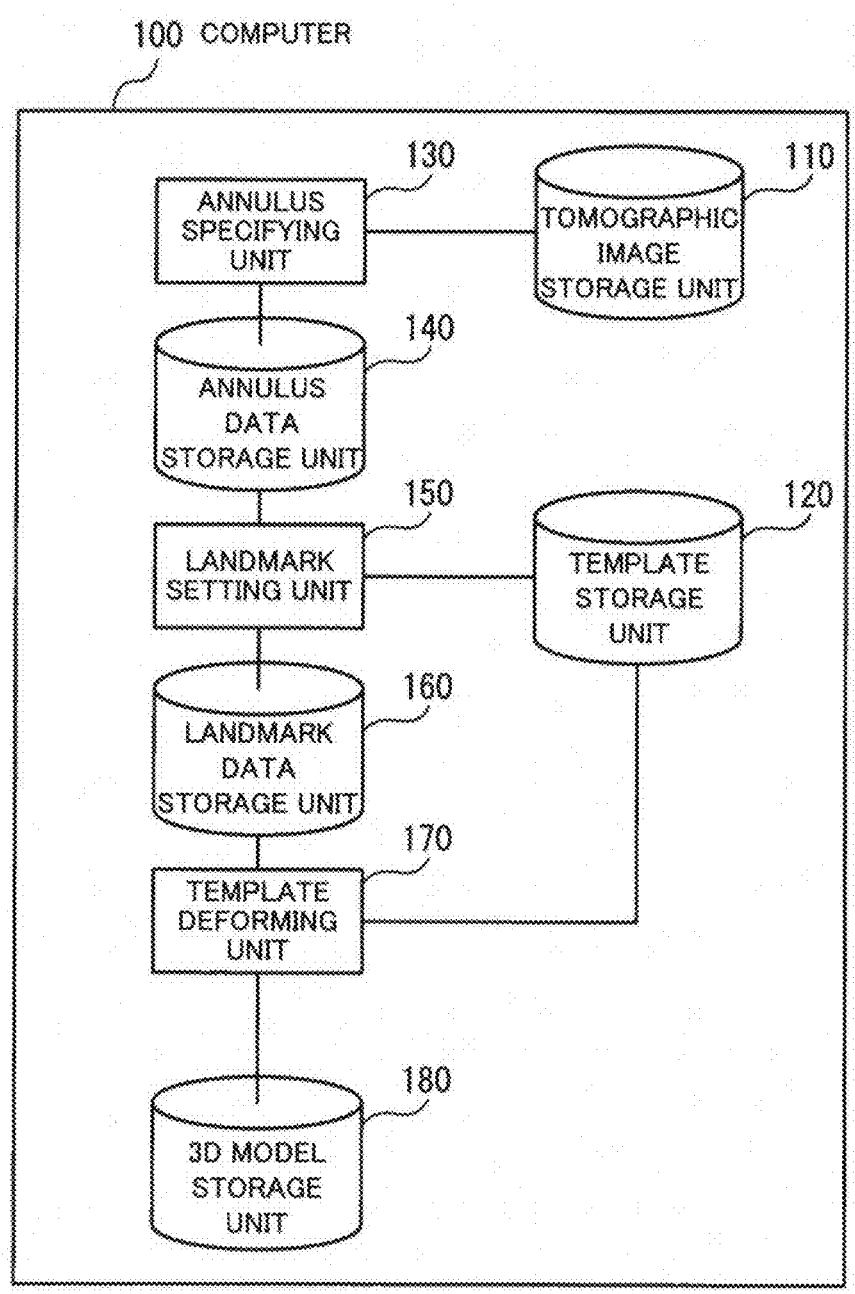
FIG. 3 is a functional block diagram of a computer according to a second embodiment.

FIG. 3 is a functional block diagram of the computer 100 according to the second embodiment. The computer 100 includes a tomographic image storage unit 110, a template storage unit 120, an annulus specifying unit 130, an annulus data storage unit 140, a landmark setting unit 150, a landmark data storage unit 160, a template deforming unit 170, and a 3D model storage unit 180.

The tomographic image storage unit 110 stores a plurality of tomographic images of the heart to be reproduced as a 3D model. For example, tomographic images of the heart of a patient captured by a computed tomography (CT) device are stored in advance in the tomographic image storage unit 110. The plurality of tomographic images are cross-sectional images of the heart at different positions. A part of the storage area of the HDD 103 serves as the tomographic image storage unit 110, for example.

The template storage unit 120 stores template data that represent a template of a 3D model (template model) of the heart. The template model is a 3D finite element model that represents the shape of the heart as a collection of tetrahedral elements. A part of the storage area of the HDD 103 serves as the template storage unit 120, for example.

The annulus specifying unit 130 specifies points on the annulus of a heart valve on the basis of the tomographic images stored in the template storage unit 120, and determines the shape of the annulus. For example, the annulus specifying unit 130 displays a tomographic image on the monitor 11. Then, the annulus specifying unit 130 receives an input for specifying the position of the annulus in the tomographic image displayed on the monitor 11. For example, the annulus specifying unit 130 receives an input for specifying three or more points on the annulus for each of the mitral, tricuspid, aortic, and pulmonary valves. The annulus specifying unit 130 sets the specified points on each annulus as target landmarks. Then, the annulus specifying unit 130 stores, as annulus data, information indicating the shape of each annulus based on the target landmarks in the annulus data storage unit 140.

The annulus data storage unit 140 stores the annulus data. A part of the storage area of the RAM 102 serves as the annulus data storage unit 140, for example.

The landmark setting unit 150 specifies source landmarks corresponding to the respective target landmarks. The source landmarks are selected from points representing the shape of the annulus in the template model that is represented by the template data stored in the template storage unit 120. For example, the landmark setting unit 150 calculates the relative positional relationship of a target landmark that is indicated by the annulus data stored in the annulus data storage unit 140. Then, the landmark setting unit 150 selects, as a source landmark corresponding to the target landmark, a point on the annulus in the template model whose positional relationship is the same as the calculated positional relationship. The landmark setting unit 150 stores, as landmark data, a pair of a target landmark and a corresponding source landmark, in the landmark data storage unit 160.

The landmark data storage unit 160 stores the landmark data. A part of the storage area of the RAM 102 serves as the landmark data storage unit 160, for example.

The template deforming unit 170 places the tomographic images and the template model in the same coordinate system. Then, the template deforming unit 170 deforms the template model such that the position of each source landmark in the template model is moved to the position of the target landmark corresponding to the source landmark. In this step, the template deforming unit 170 may correct the shape of the 3D model so as to make the shape smoother. The template deforming unit 170 stores the deformed template model as a 3D model of the heart illustrated in the tomographic images, in the 3D model storage unit 180.

The 3D model storage unit 180 stores the 3D model of the heart. A part of the storage area of the HDD 103 serves as the 3D model storage unit 180, for example.

Note that the annulus specifying unit 130 is an example of the first setting unit 4 of the first embodiment of FIG. 1. The landmark setting unit 150 is an example of an element having both functions of the determining unit 5 and the second setting unit 6 of the first embodiment of FIG. 1. The template deforming unit 170 is an example of the deforming unit 7 of the first embodiment of FIG. 1. A combination of the functions of the tomographic image storage unit 110 and the template storage unit 120 is an example of the storage unit 3 of the first embodiment of FIG. 1. The lines connecting the elements in FIG. 3 represent some of communication paths. Communication paths other than those of FIG. 3 may be provided.

Next, the tomographic images stored in the tomographic image storage unit 110 will be described.

FIG. 4 illustrates exemplary tomographic images of the heart. The tomographic image storage unit 110 stores a plurality of tomographic images 111, 112, 113, 114, and so on.

The computer 100 defines a 3D space 20 in which the heart of a patient may be accommodated. In the example of FIG. 4, the X-axis and Y-axis indicate the horizontal directions, and the Z-axis indicates the vertical direction. The plurality of tomographic images 111, 112, 113, 114, and so on of cross sections of the heart parallel to the XY-plane are captured. The tomographic images 111, 112, 113, 114, and so on are stored in the tomographic image storage unit 110, together with Z coordinate values of the image capture positions thereof.

Next, the template data stored in the template storage unit 120 will be described.

Figure 5:
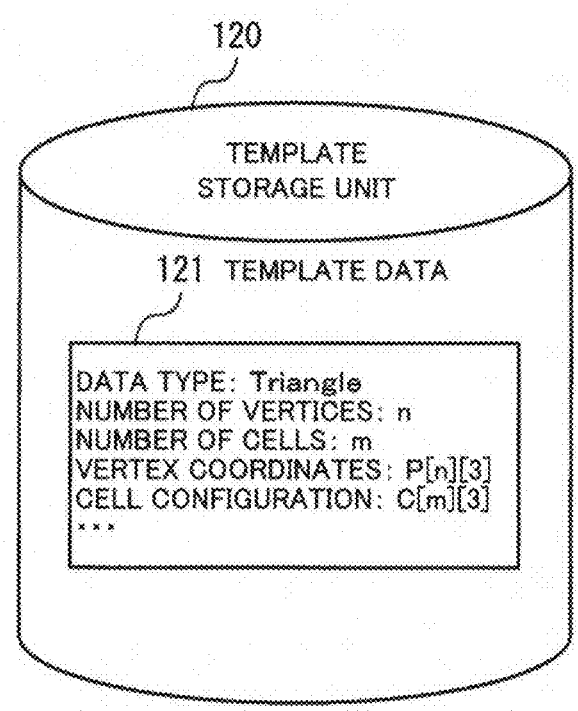
FIG. 5 illustrates an exemplary data structure in a template storage unit.

FIG. 5 illustrates an exemplary data structure in the template storage unit 120. The template storage unit 120 stores template data 121. The template data 121 represent a template model of the heart in three dimensions. The template data 121 include information on data type, the number of vertices, the number of cells, vertex coordinates, cell configuration, and the like, for example. The data type indicates the shape of the basic element. For example, if the data type is "Triangle", the template model is formed of a collection of triangular cells. The number of vertices indicates the number of vertices of the template model. The number of cells indicates the number of cells included in the template model. The vertex coordinates indicate the coordinates of each vertex in a 3D space. The vertex coordinates are stored for each vertex. The cell configuration is a list of vertices defining the shape of the cell. A cell configuration record is stored for each cell.

Next, the annulus data stored in the annulus data storage unit 140 will be described.

Figure 6:
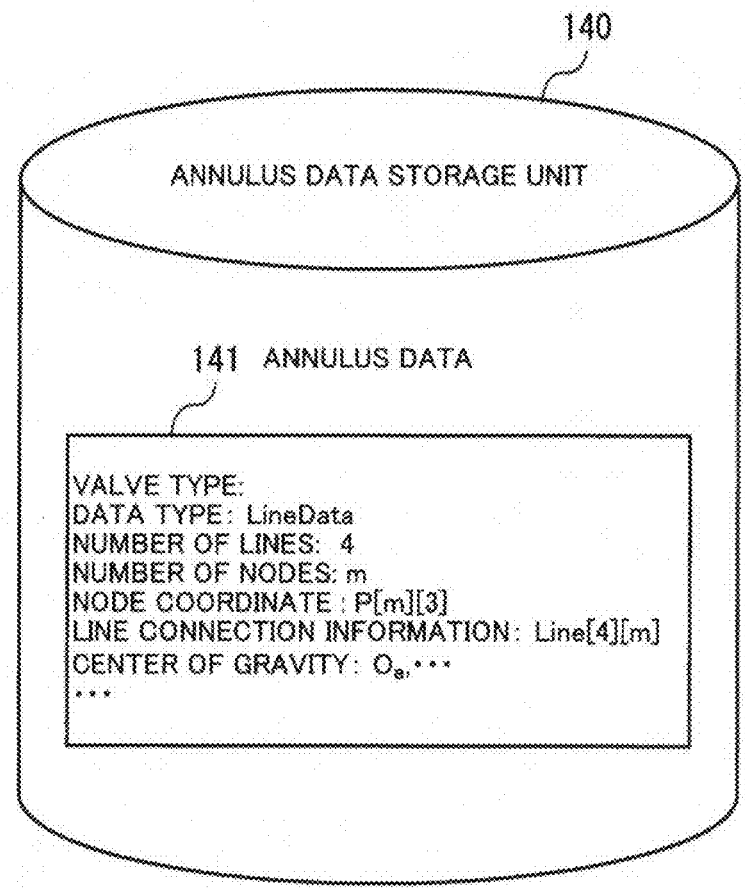
FIG. 6 illustrates an exemplary data structure in an annulus data storage unit.

FIG. 6 illustrates an exemplary data structure in the annulus data storage unit 140. The annulus data storage unit 140 stores annulus data 141 indicating the shapes of the annuli of heart valves. The annulus data 141 include information on valve type, data type, the number of lines, the number of nodes, node coordinates, line connection, the center of gravity, and the like. The valve type is information indicating of which valve the annulus is. The data type indicates the type of the graphic represented by the annulus data. For example, the data type of the annulus data 141 is line data ("LineData"). The number of lines indicates the number of lines forming the annuli. In the second embodiment, there are four lines that correspond to the mitral valve, tricuspid valve, aortic valve, and pulmonary valve, respectively. The number of nodes indicates the number of nodes defining the shapes of the annuli. The node coordinates indicate the coordinates of each node in the 3D space. The line connection information defines lines connecting the nodes. Since each line connects adjacent nodes, the line connection information defines the relationship between adjacent nodes. The center of gravity indicates the position of the center of gravity of each annulus in the 3D space.

Next, the landmark data stored in the landmark data storage unit 160 will be described.

Figure 7:
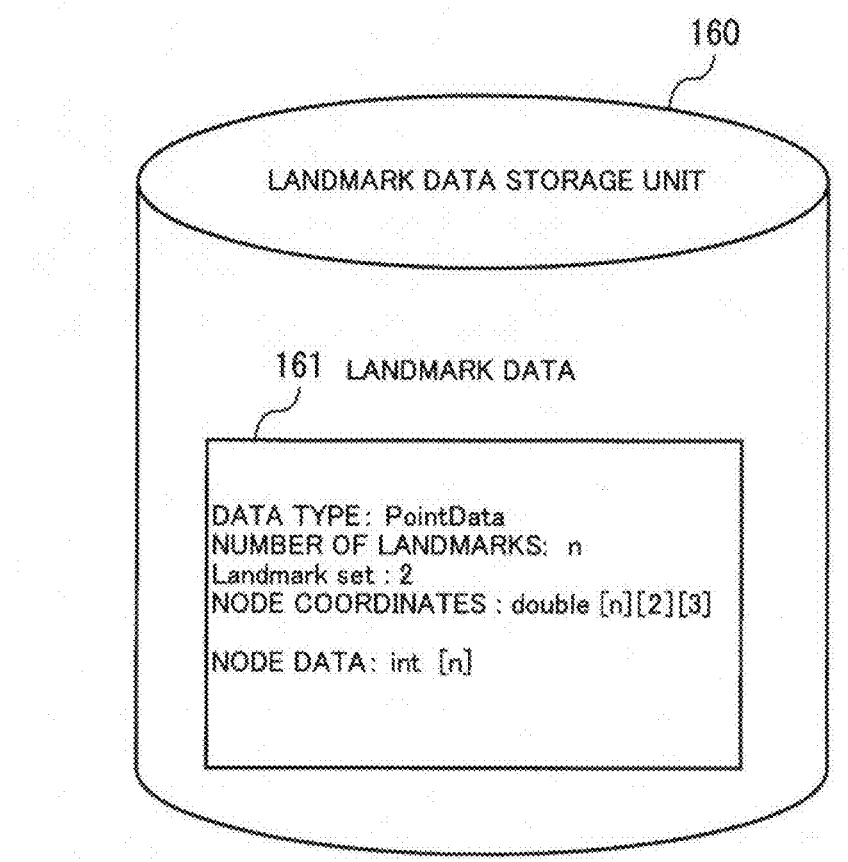
FIG. 7 illustrates an exemplary structure of landmark data.

FIG. 7 illustrates an exemplary structure of landmark data. The landmark data storage unit 160 stores landmark data 161 indicating the positions of the target landmarks and the source landmarks. The landmark data 161 include information on data type, the number of landmarks, the landmark set, node coordinates, and node data, annulus portion, and the like. The data type indicates the type of data indicating the position of the landmarks. In the example of FIG. 7, the data type of the landmark data 161 is point data ("PointData"). The number of landmarks indicates the total number of stored landmarks. The landmark set indicates the number of sets of landmarks. In the second embodiment, there are a set of target landmarks and a set of source landmarks, and hence the number of sets of landmarks is "2". The node coordinates indicate the coordinates of each landmark. The node data indicate on which annulus the node is located, for example.

Next, a description will be given of the procedure of a 3D model generation process performed by the computer 100 having the functions of FIG. 3.

Figure 8:
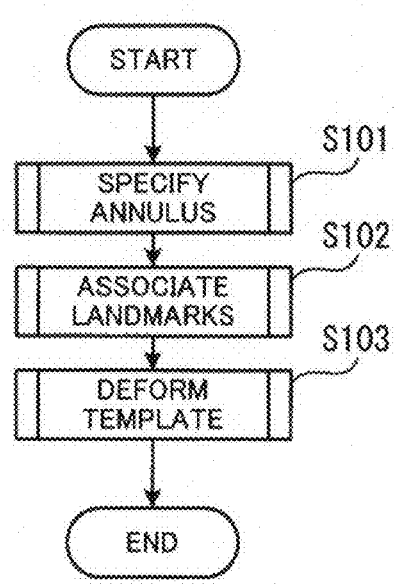
FIG. 8 is a flowchart illustrating an exemplary procedure of a 3D model generation process.

FIG. 8 is a flowchart illustrating an exemplary procedure of the 3D model generation process. In the following, the operations illustrated in FIG. 8 will be described in order of step number.

(Step S101) The annulus specifying unit 130 specifies a valve annulus on the basis of tomographic images stored in the tomographic image storage unit 110. For example, the annulus specifying unit 130 receives an input for specifying an annulus position in a tomographic image. Then, the annulus specifying unit 130 determines the coordinates of the specified position in a 3D space, on the basis of the location of the specified position in the tomographic image and the location of the tomographic image in the 3D space. The operation of specifying the annulus is performed for each of the mitral, tricuspid, aortic, and pulmonary valves. The annulus specifying process will be described below in greater detail (see FIG. 10).

(Step S102) After completion of the annulus specifying process, the landmark setting unit 150 associates a target landmark with a source landmark. For example, the landmark setting unit 150 sets the position of the annulus specified by the annulus specifying unit 130 as a target landmark. Further, the landmark setting unit 150 selects a source landmark corresponding to the target landmark, from the nodes defining the shape of the annulus in the template model, for example. The landmark associating process will be described below in greater detail (see FIG. 14).

(Step S103) The template deforming unit 170 deforms the 3D model represented by the template data such that the position of the source landmark matches the position of the target landmark. In this step, the template deforming unit 170 adjusts a curve between the corresponding points indicating the annulus in the 3D model to fit the boundary in the tomographic images such that the shape of the 3D model exactly corresponds to the tomographic images. The template deformation process will be described below in greater detail (see FIG. 19).

Next, the annulus specifying process will be described in detail. In the annulus specifying process, the user specifies the position of valve annuli in tomographic images.

Figure 9:
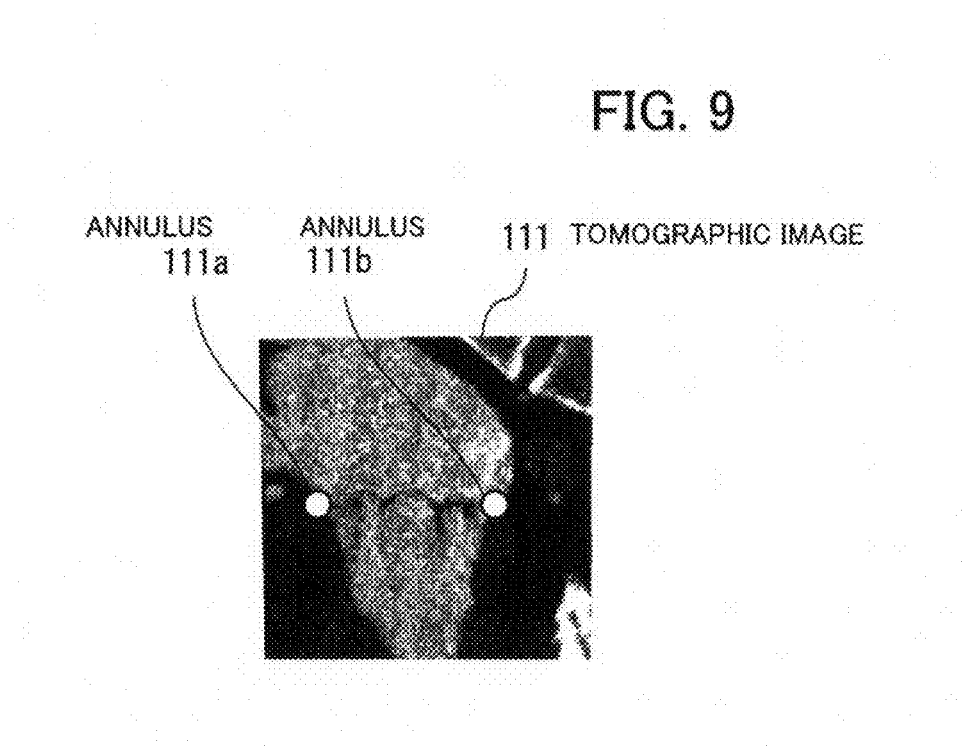
FIG. 9 is an enlarged view illustrating annuli in a tomographic image.

FIG. 9 is an enlarged view illustrating annuli in a tomographic image. In the tomographic image 111 of FIG. 9, two annuli 111a and 111b are illustrated. The user refers to the tomographic image 111 displayed on the monitor 11 so as to determine the positions of the annuli 111a and 111b. Then, the user inputs the positions of the annuli 111a and 111b in the tomographic image 111 to the computer 100, using a pointing device or the like. In this step, the user also inputs the annulus type. Then, the annulus specifying unit 130 calculates the coordinates of each of the input positions.

Figure 10:
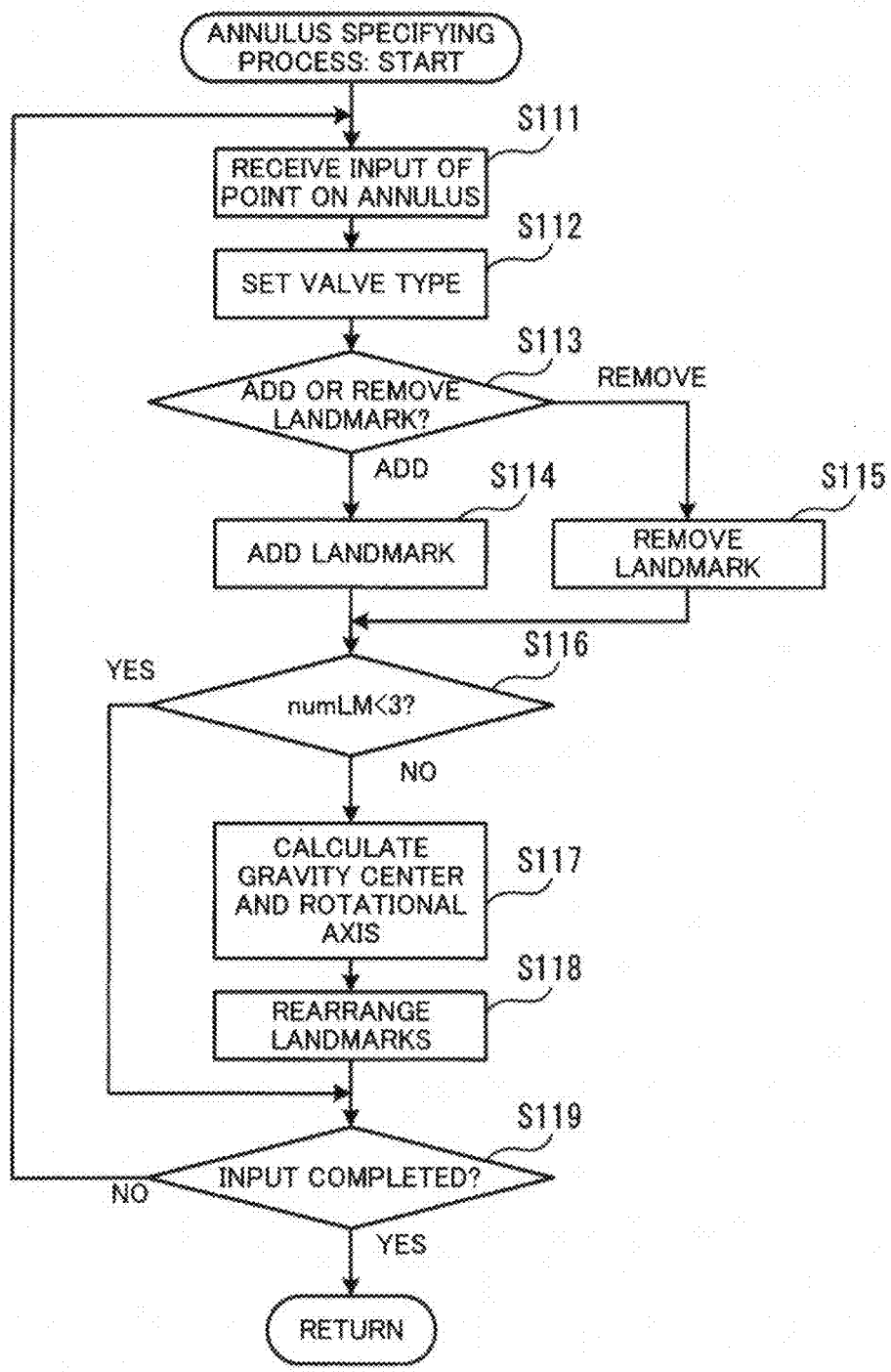
FIG. 10 is a flowchart illustrating an exemplary procedure of an annulus specifying process.

FIG. 10 is a flowchart illustrating an exemplary procedure of the annulus specifying process. In the following, the operations illustrated in FIG. 10 will be described in order of step number.

(Step S111) The annulus specifying unit 130 receives an input for specifying a point in tomographic images. For example, the annulus specifying unit 130 receives an input of a position in a tomographic image displayed on the monitor 11. Then, the annulus specifying unit 130 determines the coordinates in a 3D space based on the position of the displayed tomographic image, and sets a point indicated by the determined coordinates as a target landmark. The annulus specifying unit 130 may also receive, as an input of an annulus position, the coordinate values of a position, for example. In the case of deleting a target landmark, the annulus specifying unit 130 may receive an input for selecting a target landmark from the list of registered target landmarks.

(Step S112) The annulus specifying unit 130 receives an input for specifying a valve on which the point specified in step S111 is located.

(Step S113) The annulus specifying unit 130 receives an input indicating whether to add a target landmark or whether to remove a target landmark. If the annulus specifying unit 130 determines that the input is an instruction for adding a target landmark, the process proceeds to step S114. If the annulus specifying unit 130 determines that the input is an instruction for removing a target landmark, the process proceeds to step S115.

(Step S114) In response to the instruction for adding a target landmark, the annulus specifying unit 130 adds the point specified in step S111 to the list of target landmarks of the valve specified in step S112. Then, the process proceeds to step S116.

(Step S115) In response to the instruction for removing the target landmark, the annulus specifying unit 130 removes the point specified in step S111 from the list of target landmarks of the valve specified in step S112.

(Step S116) The annulus specifying unit 130 determines whether the number of target landmarks (numLM) registered in the target landmark list of the annulus to which the target landmark is added or from which the target landmark is removed is less than 3. If the annulus specifying unit 130 determines that the number of target landmarks is less than 3, the process proceeds to step S119. If the annulus specifying unit 130 determines that the number of target landmarks is 3 or greater, the process proceeds to step S117.

(Step S117) If three or more landmarks are set for the valve specified in step S112, the annulus specifying unit 130 calculates the center of gravity and the axis of rotation of the annulus. The center of gravity is the mean of the values of the target landmarks on each axis, for example. The axis of rotation of the annulus is, for example, an axis passing through the center of gravity of the annulus and extending in the same direction as a cross product v that is obtained by the following equation on the basis of the centers of gravity of the annuli of three valves, which are an aortic valve $O_a$, a tricuspid valve $O_t$, and a mitral valve $O_m$.

$$v = O_t O_a \times O_m O_a \quad (1)$$

(Step S118) The annulus specifying unit 130 rearranges the target landmarks. For example, the annulus specifying unit 130 rearranges the target landmarks on the target landmark list such that the target landmarks are arranged clockwise in the v direction from the center of gravity on the annulus of the valve specified in step S112.

(Step S119) The annulus specifying unit 130 determines whether the input for specifying an annulus is completed. For example, the annulus specifying unit 130 determines that the input for specifying an annulus is completed when the user provides an input indicating a completion of the input for specifying an annulus. If the annulus specifying unit 130 determines that the input for specifying an annulus is completed, the annulus specifying process ends. If the annulus specifying unit 130 determines that the input for specifying an annulus is not completed, the process proceeds to step S111.

With this process, the user may add the coordinates of a point to or remove the coordinates of a point from a desired position on a desired annulus. The shapes of the annuli are represented by the line data connecting the points of target landmarks that are set for the respective annuli.

Figure 11:
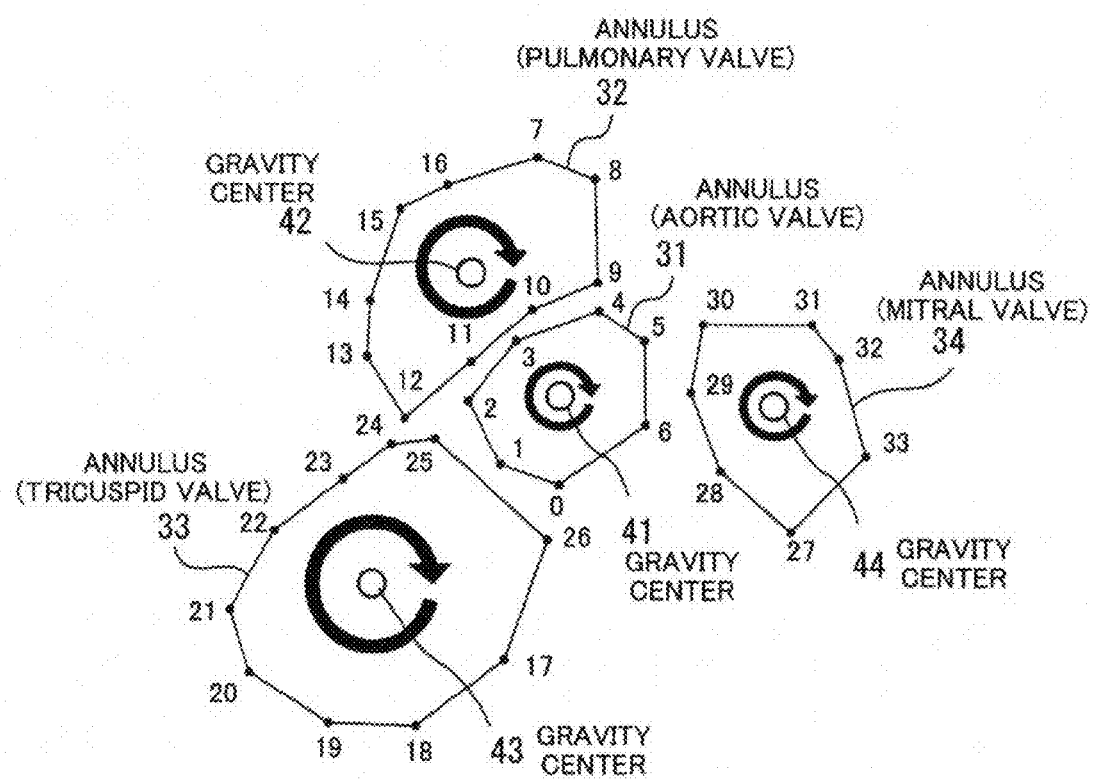
FIG. 11 illustrates exemplary line data of annuli based on target landmarks.

FIG. 11 illustrates exemplary line data of annuli based on target landmarks. As illustrated in FIG. 11, a plurality of target landmarks are set for each of annuli 31 through 34. The annulus 31 is the aortic valve annulus. The annulus 32 is the pulmonary valve annulus. The annulus 33 is the tricuspid valve annulus. The annulus 34 is the mitral valve annulus.

In FIG. 11, the positions of the vertices of polygons representing the shapes of the annuli 31 through 34 are the target landmarks. An identification number is assigned to each target landmark. In FIG. 11, the number next to each target landmark indicates the identification number of the landmark. The identification numbers are assigned in the ascending order from the top of the landmark list that is sorted in step S118 of FIG. 10. In the example of FIG. 11, the identification numbers are assigned sequentially from one of the landmarks of the annuli 31 through 34 as a start point, in the clockwise direction with respect to centers of gravity 41 through 44. The identification numbers increment by 1 for each landmark.

Next, the landmark associating process will be described in detail.

In the second embodiment, in order to allocate source landmarks on the annuli in the template that correspond to the input target landmarks, the landmark setting unit 150 specifies one point as a start point, and then sequentially allocates corresponding source landmarks. For example, the landmark setting unit 150 may specify a start point on the basis of the position of the annulus of the aortic valve with respect to the annuli of the other valves.

Figure 12:
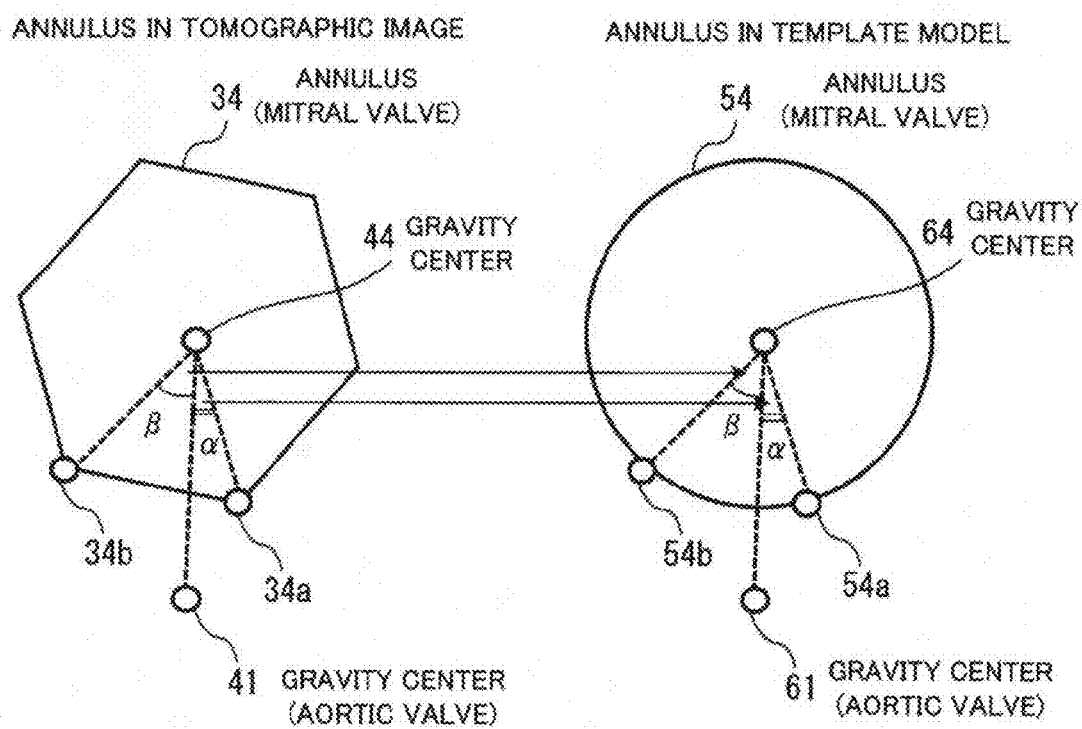
FIG. 12 illustrates an example of setting a start point of source landmarks.

FIG. 12 illustrates an example of setting a start point of source landmarks. More specifically, FIG. 12 illustrates an example of setting a start point of source landmarks of the mitral valve in the template model.

The curve of an annulus 54 of the mitral valve in the template model is given by $v_{tmp}(s) = (x_{tmp}(s), y_{tmp}(s))$, $s \in [0,1]$. Further, the curve of the annulus 34 based on the target landmarks is given by $v(s) = (x(s), y(s))$, $s \in [0,1]$. Then, the landmark setting unit 150 selects, as start points, target landmarks 34a and 34b located on the opposite sides of a point $P_m$, which is given by $P_m = \min(dis(O_m, v(s)))$. Note that $dis(x,y)$ is the distance between x and y, and $\min(dis(x,y))$ is the minimum distance. The locations of the target landmarks 34a and 34b specified as the start points are $L^t_0$ and $L^t_1$.

In the example of FIG. 12, the two target landmarks 34a and 34b are selected as start points. However, only one of the two target landmarks 34a and 34b may be selected as a start point. For example, only the target landmark closer to the point $P_m$ may be selected as a start point.

Then, the landmark setting unit 150 detects points on the annulus 54 in the template model having the same relative positional relationships with the center of gravity as the target landmarks 34a and 34b, respectively, and sets the points as corresponding source landmarks 54a and 54b. The locations of the source landmarks 54a and 54b are denoted by $L^s_0$ and $L^s_1$, respectively.

The relative positional relationship with the center of gravity indicates, for example, the angle formed by a vector from the center of gravity of the annulus of interest to the center of gravity of the aortic valve annulus and a vector from the center of gravity of the annulus of interest to a landmark. That is, a point whose angle formed by these two vectors is the same as that of a target landmark is set as a source landmark. For example, in the example of FIG. 12, the angle formed by a vector from the center of gravity 44 of the annulus 34 of the mitral valve based on the target landmarks that are set in the tomographic images to the center of gravity 41 of the annulus 31 of the aortic valve and a vector from the center of gravity 44 to the target landmark 34a is α. Further, the angle formed by a vector from the center of gravity 44 of the annulus 34 to the center of gravity 41 of the annulus 31 of the aortic valve and a vector from the center of gravity 44 to the target landmark 34b is β.

For example, the landmark setting unit 150 draws a line from a center of gravity 64 of the annulus 54 of the mitral valve in the template model such that the angle formed by the line and a vector from the center of gravity 64 and a center of gravity 61 of the aortic valve annulus is α. Then, the landmark setting unit 150 sets the intersection of the line drawn from the center of gravity 64 with the annulus 54 of the mitral valve as the source landmark 54a corresponding to the target landmark 34a. Similarly, the landmark setting unit 150 draws a line from the center of gravity 64 of the annulus 54 of the mitral valve such that the angle formed by the line and a vector from the center of gravity 64 to the center of gravity 61 of the aortic valve annulus is β. Then, the landmark setting unit 150 sets the intersection of the line drawn from the center of gravity 64 with the annulus 54 of the mitral valve as the source landmark 54b corresponding to the target landmark 34b.

The relative positional relationship of the target landmark or the source landmark with the centers of gravity of two annuli is expressed as follows.

$$\begin{cases} \dfrac{\overrightarrow{O_m O_a} \cdot \overrightarrow{O_m L^t_0}}{|\overrightarrow{O_m O_a}| \cdot |\overrightarrow{O_m L^t_0}|} = \dfrac{\overrightarrow{_{tmp} O_m \cdot O_a} \cdot \overrightarrow{_{tmp} O_m L^s_0}}{|\overrightarrow{_{tmp} O_m L^s_0}| \cdot |\overrightarrow{_{tmp} O_m L^s_0}|} \\ \dfrac{\overrightarrow{O_m O_a} \cdot \overrightarrow{O_a L^t_1}}{|\overrightarrow{O_m O_a}| \cdot |\overrightarrow{O_a L^t_1}|} = \dfrac{\overrightarrow{_{tmp} O_m \cdot O_a} \cdot \overrightarrow{_{tmp} O_m L^s_1}}{|\overrightarrow{_{tmp} O_m O_a}| \cdot |\overrightarrow{_{tmp} O_m L^s_1}|} \end{cases} \quad (2)$$

In the equation (2), a subscript "$_{tmp}$" is added at the lower left of the vector of the template model. The left-hand side of the equation (2) is an expression for calculating a cosine α·cosine β in the annulus based on the tomographic images. The right-hand side of the equation (2) is an expression for calculating a cosine α·cosine β in the annulus based on the template model. After the start positions of the source landmarks are specified, the landmark setting unit 150 places source landmarks corresponding to the other target landmarks. In this step, the source landmarks are placed such that distance ratio between the source landmarks is equal to the distance ratio between the target landmarks.

Figure 13:
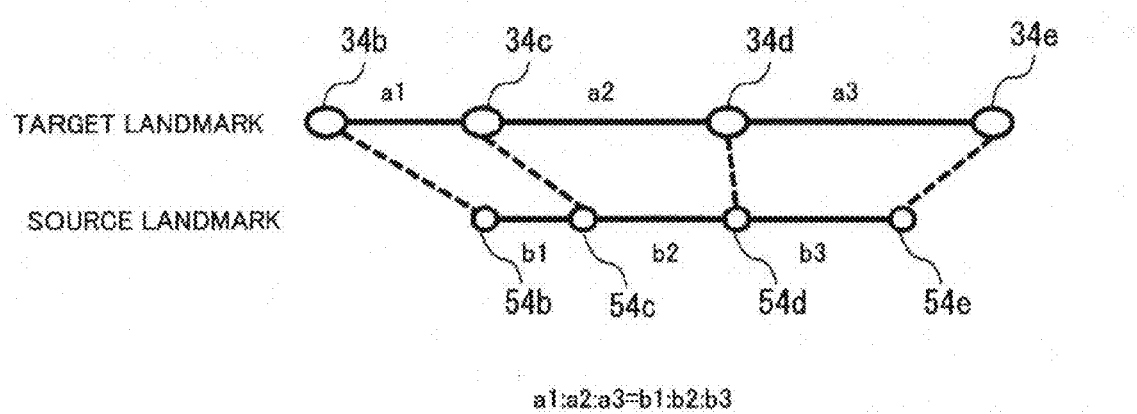
FIG. 13 illustrates the relationship of the distance ratio between landmarks.

FIG. 13 illustrates the relationship of the distance ratio between landmarks. In the example of FIG. 13, the target landmarks 34b, 34c, 34d, and 34e are illustrated at the upper side. The distance between the target landmarks 34b and 34c is "a1". The distance between the target landmarks 34c and 34d is "a2". The distance between the target landmarks 34d and 34e is "a3". In this case, the distance ratio between the target landmarks 34b, 34c, 34d, and 34e is "a1:a2:a3".

At the lower side of FIG. 13, the source landmarks 54b, 54c, 54d, and 54e are illustrated. The source landmark 54b is associated with the target landmark 34b. The source landmark 54c is associated with the target landmark 34c. The source landmark 54d is associated with the target landmark 34d. The source landmark 54e is associated with the target landmark 34e.

The distance between the source landmarks 54b and 54c is "b1". The distance between the source landmarks 54c and 54d is "b2". The distance between the source landmarks 54d and 54e is "b3". In this case, the landmark setting unit 150 sets the distance ratio "b1:b2:b3" between the source landmarks 54b, 54c, 54d, and 54e to be equal to the distance ratio "a1:a2:a3" between the target landmarks 34b, 34c, 34d, and 34e.

In this way, the source landmarks of the mitral, tricuspid, and pulmonary valves may be set. With regard to the aortic valve, the landmark setting unit 150 detects, from the annulus data, three target landmarks on the aortic valve annulus that are the closest to the centers of gravity of the mitral, tricuspid, and pulmonary valves, respectively, and selects the detected target landmarks as start positions, for example. Then, the landmark setting unit 150 sets source landmarks corresponding to the target landmarks located in the start positions, on the aortic valve annulus in the template model. The positions of these source landmarks are specified on the basis of, for example, the relative positional relationship with the center of gravity of the annulus. For instance, the source landmark corresponding to the target landmark that is the closest to the mitral valve, among the target landmarks of the aortic valve of the annulus data, is specified on the basis of the relative positional relationship with the center of gravity of the aortic valve annulus and the center of gravity of the mitral valve annulus. For example, the source landmark is set at a position such that the target landmark and the corresponding source landmark satisfy a relationship similar to that of the equation (2). Further, the landmark setting unit 150 places the source landmarks of the aortic valve other than those in the start points such that the distance ratio between the source landmarks is equal to the distance ratio between the target landmarks, for example.

Figure 14:
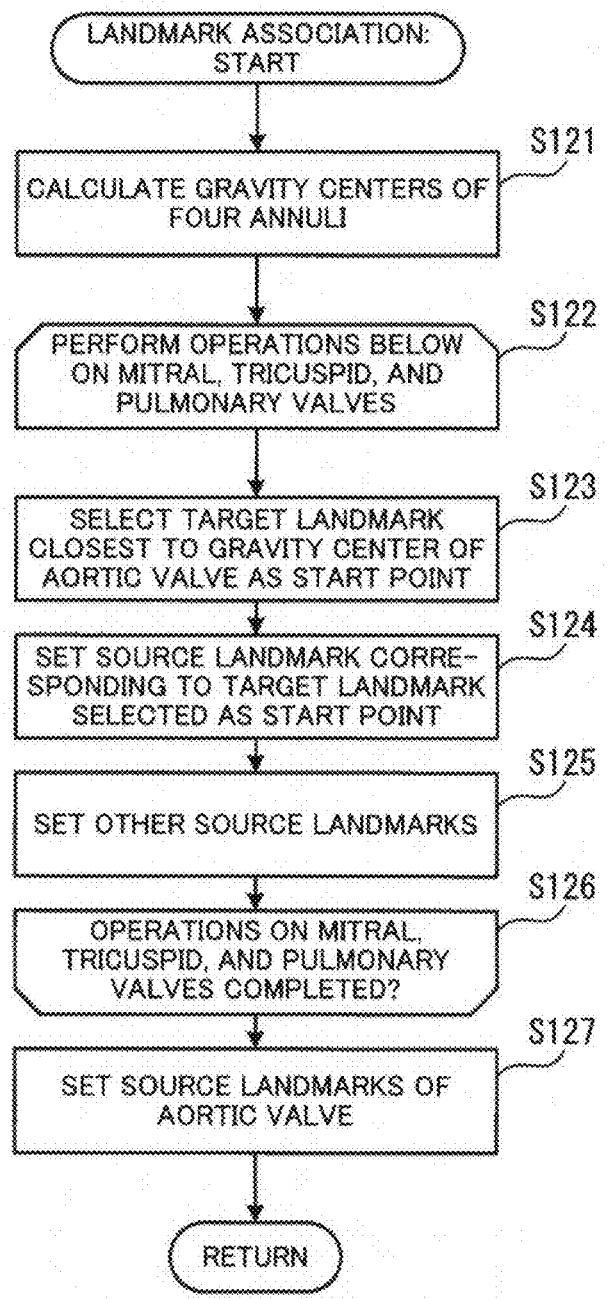
FIG. 14 is a flowchart illustrating an exemplary procedure of a landmark associating process.

FIG. 14 is a flowchart illustrating an exemplary procedure of the landmark associating process. In the following, the operations illustrated in FIG. 14 will be described in order of step number.

(Step S121) The landmark setting unit 150 calculates the centers of gravity of the four annuli in the template model of the heart on the basis of the template data.

(Step S122) The landmark setting unit 150 sequentially selects the mitral valve, the tricuspid valve, and the pulmonary valve, and performs operations of steps S123 through S125 on the selected valve of interest.

(Step S123) The landmark setting unit 150 detects, from the target landmarks of the valve of interest, a point on the annulus data that is the closest to the center of gravity of the aortic valve annulus, and selects the detected point as a start point. For example, the landmark setting unit 150 calculates a line segment connecting the center of gravity of the annulus of the valve of interest and the center of gravity of the aortic valve annulus. Then, the landmark setting unit 150 calculates the intersection of the calculated line segment and the annulus of the valve of interest. Further, the landmark setting unit 150 selects two target landmarks located on the opposite sides of the calculated intersection as start points.

(Step S124) The landmark setting unit 150 sets, on the annulus of the valve of interest in the template model, source landmarks corresponding to the target landmarks that are selected as the start points. The position of each source landmark that is set in this step is determined on the basis of the relative positional relationship with the center of gravity of the annulus of the valve of interest and the center of gravity of the aortic valve annulus on the basis of the equation (2), for example.

(Step S125) The landmark setting unit 150 sets other source landmarks. The other source landmarks are the source landmarks corresponding to the target landmarks other than the starting points. For example, the landmark setting unit 150 places the other source landmarks in positions such that the distance ratio between the source landmarks is equal to the distance ratio between the target landmarks, for example.

(Step S126) If the landmark setting unit 150 has completed the operations of step S123 through S125 for each of the mitral, tricuspid, and pulmonary valves, the process proceeds to step S127. If there are unprocessed valves, the landmark setting unit 150 selects one of the unprocessed valves as a valve of interest, and performs the operations of steps S123 through S125 on the valve of interest.

(Step S127) The landmark setting unit 150 sets source landmarks for the aortic valve. For example, the landmark setting unit 150 specifies source landmarks corresponding to three target landmarks on the aortic valve annulus that are the closest to the centers of gravity of the mitral, tricuspid, and pulmonary valves, respectively, on the basis of their relative positional relationships with the centers of gravity of the respective annuli. Then, the landmark setting unit 150 places the other source landmarks such that the distance ratio between the source landmarks is equal to the distance ratio between the target landmarks, for example.

In this way, source landmarks corresponding to the respective target landmarks are set.

FIG. 15 illustrates exemplary source landmarks that are set in association with target landmarks. At the left side of FIG. 15, target landmarks and the annuli 31 through 34 formed on the basis of the target landmarks are illustrated. At the right side of FIG. 15, source landmarks and the annuli 51 through 54 in the template model on which the source landmarks are set are illustrated.

The target landmarks are assigned identification numbers which uniquely identify the target landmarks within a group of target landmarks. The source landmarks are assigned identification numbers which uniquely identify the source landmarks within a group of source landmarks. The same identification number is assigned to a pair of corresponding source landmark and target landmark.

Next, the template deformation process performed by the template deforming unit 170 will be described. In the template deformation process, a deformation process based on landmarks and a fitting process based on a tomographic image are performed. The deformation process based on landmarks is a process for deforming the template model such that the positions of source landmarks in the template model match the positions of target landmarks corresponding to the source landmarks. The fitting process based on tomographic images is a process for fitting a curve between the corresponding points of an estimated annulus to the boundary in a medical image such that the shape in the template model exactly corresponds to the shape in the medical image.

FIG. 16 illustrates an example of a deformation process based on landmarks. FIG. 16 depicts how the positions of landmarks of the mitral valve are moved to the positions of corresponding target landmarks. In FIG. 16, the annulus 34 based on the target landmarks is indicated by the broken line, and the annulus 54 based on the source landmarks is indicated by the solid line. Each source landmark on the annulus 54 is moved to the position of the target landmark that is assigned the same identification number.

For moving a source landmark, the node in the position of the source landmark and the nodes in the vicinity of that node are moved, among the nodes (vertices) of the template model. The source landmark is moved when the node in the position of that source landmark is moved. By moving the source landmarks in this way, the template model is deformed.

FIG. 17 illustrates an example of deforming a template model based on landmarks. FIG. 17 depicts how the shapes of the annuli of heart valves of the template model changed before and after deformation. In FIG. 17, the template model before deformation is illustrated at the left side, and the template after deformation is illustrated at the right side.

The positions of the source landmarks are moved to the positions of the corresponding target landmarks as illustrated in FIG. 17, so that the shapes of the annuli are changed. When a sufficient number of accurate target and source landmarks are received, a sufficient amount of information to conform the template shape to the shape of the annulus of interest is obtained. However, in the case of more accurately interpolating information on the template or in the case of correcting displacement of landmarks due to manual operation, a fitting process based on a tomographic image is performed.

In the fitting process, the template deforming unit 170 modifies the template model so as to obtain a smooth curve aligned with the boundary of the annulus in the medical image. For example, the template deforming unit 170 first provides a sufficient density of nodes on the generated annulus data. The template deforming unit 170 moves these nodes so as to generate annulus data that match the boundary in the medical image.

The nodes may be moved by using a method called active contour model (ACM), for example. The active contour model is a method that sets a contour in the vicinity of the boundary in the image, and iteratively modifies the position and the shape of the contour so as to satisfy predetermined conditions. Examples of predetermined conditions may include a condition that "the contour is located at the point of sharp density (luminance) change in the image".

Figure 18:
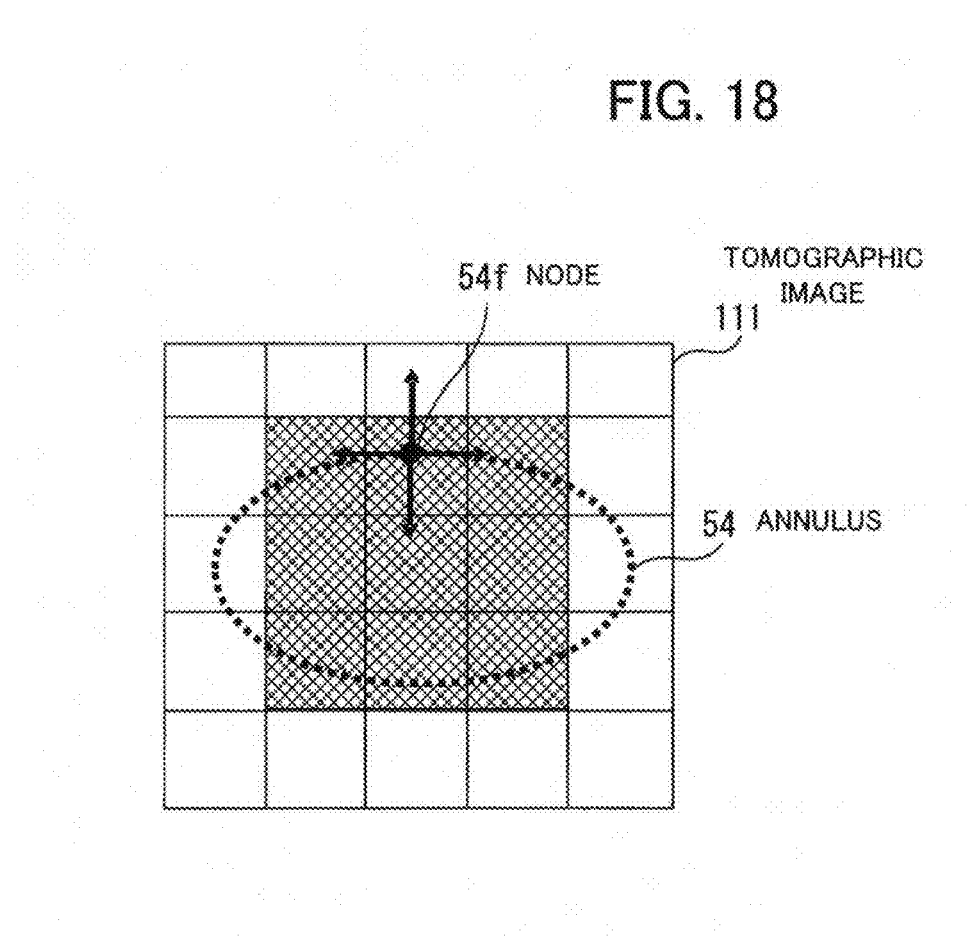
FIG. 18 illustrates an example of an annulus fitting method based on a tomographic image.

FIG. 18 illustrates an example of an annulus fitting method based on a tomographic image. FIG. 18 depicts the tomographic image 111 illustrating the annulus, and the annulus 54 in the cross section of the deformed template model corresponding to the tomographic image. In FIG. 18, the area of low luminance in the tomographic image is indicated by hatching.

In the tomographic image 111, the annulus appears on the boundary between the area of low luminance and the area of high luminance. Thus, in the second embodiment, the annulus 54 is deformed such that the line indicating the annulus 54 of the template model is aligned with the luminance boundary in the tomographic image 111. For example, the template deforming unit 170 selects a node 54$f$ from a plurality of nodes defining the shape of the annulus 54, and compares the luminance gradient of the tomographic image 111 at the position of the node 54$f$ which is moved in any of six directions (upward, downward, left, right, front, rear) in three dimensions with that at the position of the node 54*f* which is not moved. Then, the template deforming unit 170 moves the node 54*f* to one of the seven positions which has the steepest luminance gradient.

The template deforming unit 170 repeats such a node moving operation for all the nodes of the annulus 54. Thus, the line representing the shape of the annulus 54 is moved onto the luminance boundary in the tomographic image 111.

This annulus fitting process may be performed by the following calculations.

First, the curve of an annulus is given by v(s)=(x(s),y(s)), s∈[0,1]. Then, the template deforming unit 170 performs the following equation (3).

$$E=\int_0^1 \{E_{int}(\vec{v}(s))+E_{image}(\vec{v}(s))+E_{con}(\vec{v}(s))\}ds \quad (3)$$

Then, the template deforming unit 170 finds x and y that minimize E given by the equation (3). Note that, in the equation (3), $E_{int}$ is the internal energy; $E_{image}$ is the image energy; and $E_{con}$ is the external energy. The template deforming unit 170 defines each energy as follows.

First, the internal energy is defined by the following equation (4).

$$E_{int} = \frac{1}{2}\left(\alpha\left|\frac{d\vec{v}}{ds}\right|^2 + \beta\left|\frac{d^2\vec{v}}{ds^2}\right|^2\right) \quad (4)$$

where α and β are positive constants. The energy given by the first term of the equation (4) decreases as the overall length of the curve decreases, and the energy given by the second term decreases as the curve becomes closer to a smooth straight line. The internal energy acts to make the line of the annulus shorter and smoother.

As for the image energy, smaller energy is imparted to locations with greater luminance change rate. For example, the image energy is defined by the following equation (5).

$$E_{image}=-\gamma|\nabla I(v(s))|^2 \quad (5)$$

where I(v(s)) is the luminance in the position v(s), and γ is a positive constant. However, in the second embodiment, in order to facilitate alignment with the boundary, the image energy is defined by the following equation (6) using the directional derivative of the displacement vector u of the node.

$$E_{image}=-\gamma|\nabla I(v(s))\cdot u|^2 \quad (6)$$

This image energy acts to align the line of the annulus with the luminance boundary (the contour of the image appeared in the tomographic image).

The external energy is defined by the following equations (7) and (8) so as to prevent the nodes on the set target landmarks from being moved.

For example, the following equation is used for the nodes on the target landmarks.

$$E_{con}(v(s))=-\eta e^{-dis(v(s),L)^2} \quad (7)$$

For the other nodes, the following equation is used.

$$E_{con}(v(s))=0 \quad (8)$$

In the equation (7), dis(v(s),L) is the distance between the node and the target landmark, and n is a positive constant. Accordingly, smaller external energy is imparted to nodes closer to target landmarks. This external energy acts to make nodes closer to target landmarks move less easily. Note that since the source landmarks are already moved to the positions of the corresponding target landmarks, dis(v(s),L) may be considered as the distance between a node and a source landmark.

The template deforming unit 170 moves the nodes in the template model in a direction in which the energy E is reduced. The thus obtained template model is a 3D heart model having valve annuli whose shapes precisely conform to the shapes of the annuli in the tomographic image.

In the following, the procedure of a template deformation process will be described.

Figure 19:
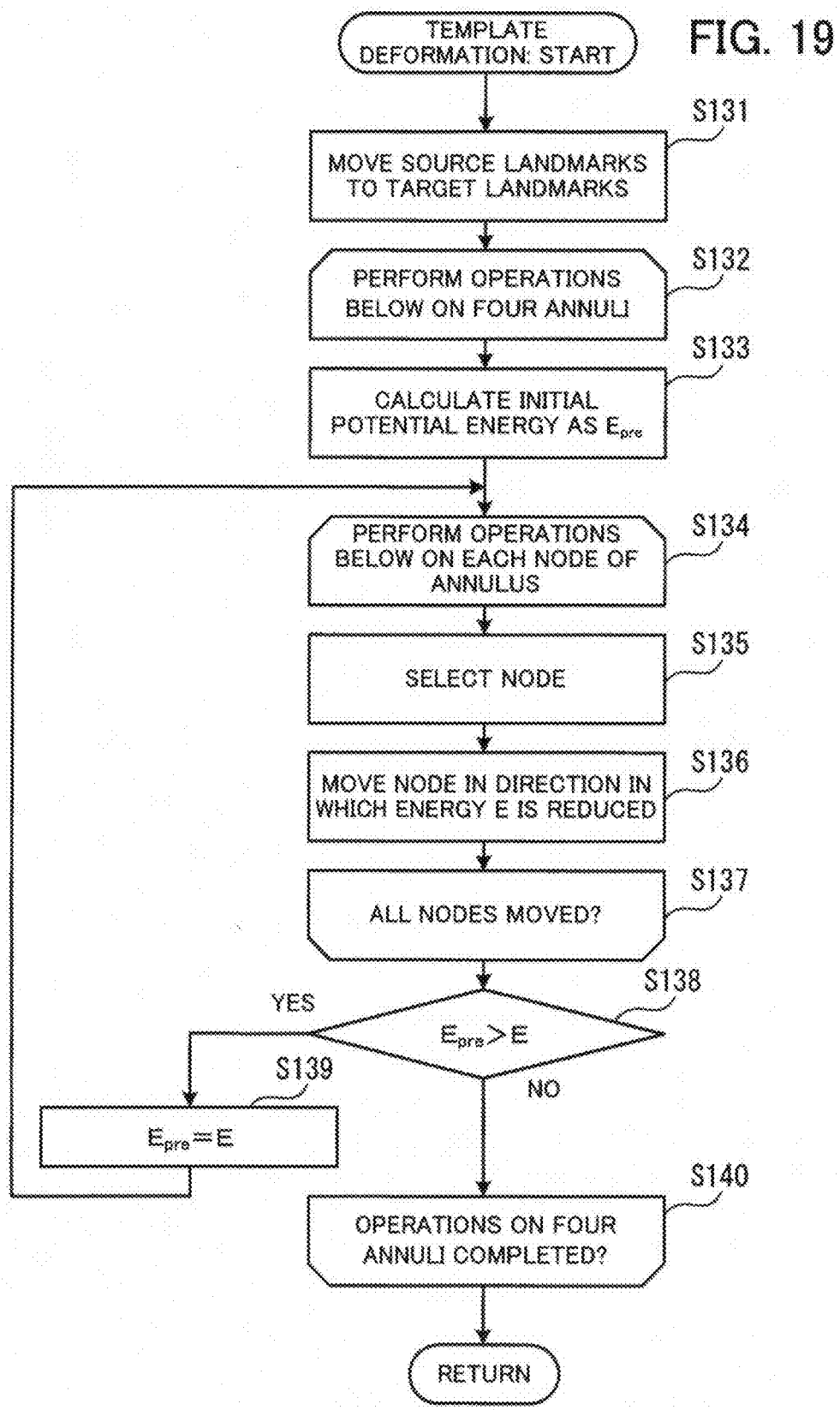
FIG. 19 is a flowchart illustrating an exemplary procedure of a template deformation process.

FIG. 19 is a flowchart illustrating an exemplary procedure of the template deformation process. In the following, the operations illustrated in FIG. 19 will be described in order of step number.

(Step S131) The template deforming unit 170 moves source landmarks in the template model to the positions of corresponding target landmarks.

(Step S132) The template deforming unit 170 performs operations of steps S133 through S139 on each of the annuli of the four valves.

(Step S133) The template deforming unit 170 calculates, as $E_{pre}$, an initial potential energy E by the equation (3).

(Step S134) The template deforming unit 170 performs operations of steps S135 and S136 for each node on the annulus of interest.

(Step S135) The template deforming unit 170 selects one of the nodes on which the iterative operations of steps S135 and S136 are not performed.

(Step S136) The template deforming unit 170 moves the selected node in a direction in which the energy E is reduced. Note that, if the energy E is minimized when the node is not moved, the template deforming unit 170 does not move the node.

(Step S137) If the template deforming unit 170 has completed the node moving operation on all the nodes on the annulus of interest, the process proceeds to step S138. If there is a node on which the moving operation is not performed, the process returns to step S135 such that the template deforming unit 170 repeats the operation.

(Step S138) The template deforming unit 170 determines whether the energy E of the annulus of interest is less than $E_{pre}$. If the template deforming unit 170 determines that the energy E is less, the process proceeds to step S139. If the energy E is not less than $E_{pre}$, the template deforming unit 170 terminates the operation on the current annulus of interest, and then the process proceeds to step S140.

(Step S139) The template deforming unit 170 sets the energy E of the current annulus of interest to $E_{pre}$, and the process proceeds to step S134.

(Step S140) If the template deforming unit 170 has completed the operations of steps S133 through step S139 on each of the annuli of the four valves, the template deformation process ends. If there is an annulus on which the operations are not performed, the process proceeds to step S132, in which the template deforming unit 170 performs the operations on the annulus.

In this way, template deformation is performed. In the second embodiment, the fitting process is performed in addition to the process for matching source landmarks with target landmarks. Therefore, it is possible to accurately match the valve annulus in the 3D model with the valve annulus in the tomographic image.

Figure 20:
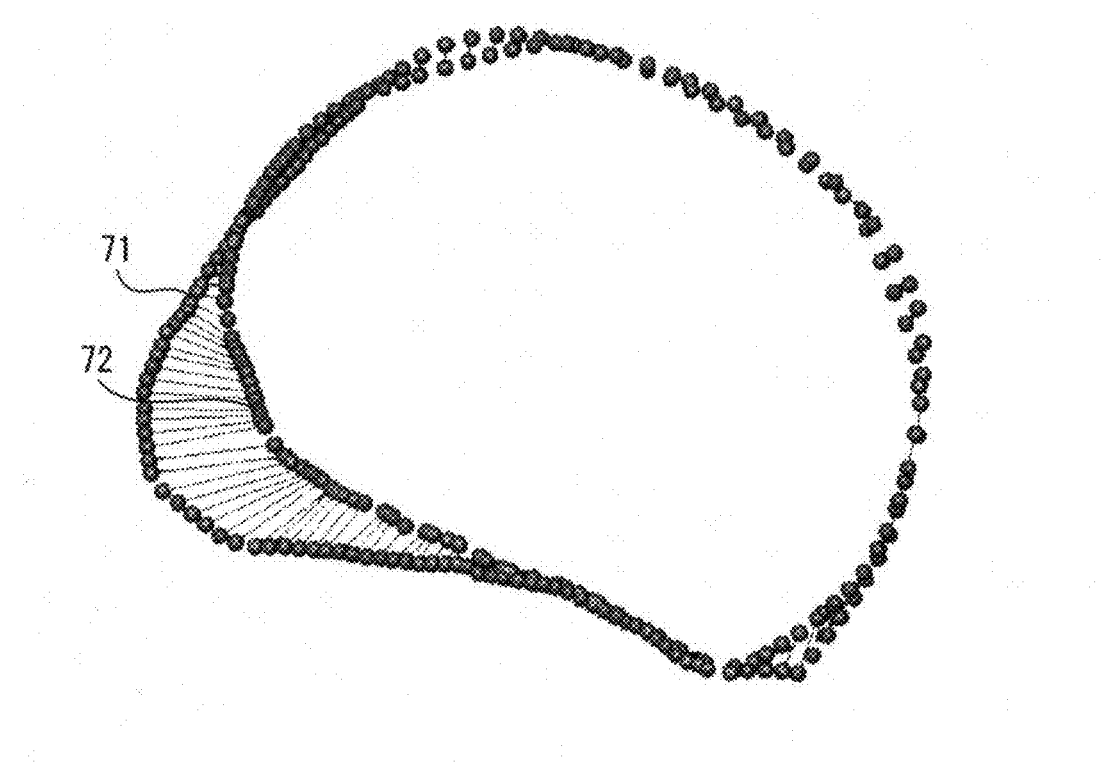
FIG. 20 illustrates an example of deforming an annulus by a fitting process.

FIG. 20 illustrates an example of modifying an annulus by the fitting process. In FIG. 20, a node group before the fitting process is denoted by a reference numeral 71, and a node group that has been moved by the fitting process is denoted by 72.

In a comparative example, the internal energy $E_{int}$, the image energy $E_{image}$, and the external energy $E_{con}$ are defined by the following equations (9), (10), and (11), respectively, and then the energy E of equation (3) is calculated.

$$E_{int} = \frac{1}{2}\left(\alpha\left|\frac{d\vec{v}}{ds}\right|^2 + \beta\left|\frac{d^2\vec{v}}{ds^2}\right|^2\right) \quad (9)$$

$$E_{image} = -\gamma|\nabla I(v(s))|^2 \quad (10)$$

$$E_{con}(v(s)) = 0 \quad (11)$$

With these equations, the effect of preventing the nodes on the set landmarks from being moved is not provided. Therefore, the nodes move inward so as to reduce the internal energy. Accordingly, if the initial position is located at the inner side of the boundary of the annulus in the tomographic image, the annulus contracts and becomes smaller.

Figure 21:
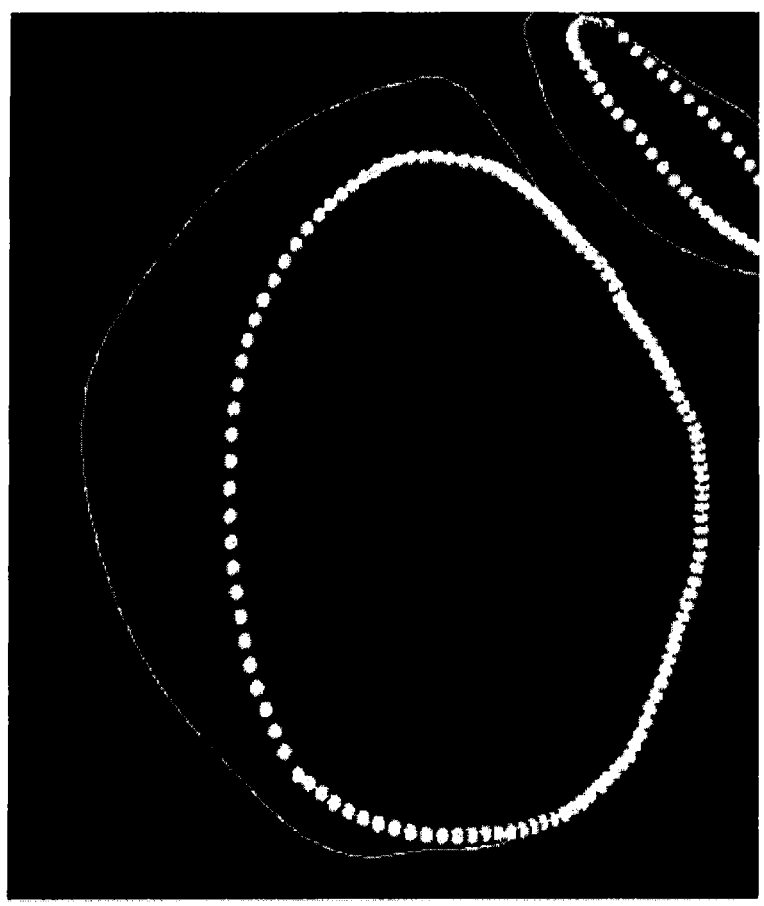
FIG. 21 illustrates an exemplary result of a fitting process using equations of a comparative example.

FIG. 21 illustrates an exemplary result of a fitting process using the equations of the comparative example. In FIG. 21, the annulus before the fitting process is indicated by the white line. The annulus after the fitting process is indicated by a collection of nodes (white circles in FIG. 21). In the example of FIG. 21, the annulus has contracted and become smaller due to the fitting process. That is, in the case the where the equation (7) is not used to define the external energy, the accuracy might be reduced.

As described above, according to the second embodiment, it is possible to obtain a 3D model that conforms to a tomographic image, on the basis of points on valve annuli in a tomographic image which are specified by the user. Furthermore, since source landmarks corresponding to target landmarks of one valve annulus are specified on the basis of the relative positional relationship between the center of gravity of the valve annulus and that of another valve annulus, the relative positional relationship between the annuli is accurate. Accordingly, it is possible to prevent the deformed model from being distorted due to an inaccurate relative positional relationship between the valve annuli in the generated 3D model.

Further, since a fitting process is performed after moving the source landmarks to the positions of the corresponding target landmarks, even if there are a small number of target landmarks, it is possible to reproduce the annulus shape with higher accuracy. Furthermore, it is possible to reduce the number of times that the user specifies an annulus position on a tomographic image, and therefore possible to improve the work efficiency.

According to one aspect, it is possible to accurately reproduce, as a 3D model, the shape of an organ represented in tomographic images.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A computer-readable storage medium storing a computer program for causing a computer to perform a procedure, the procedure comprising:
    setting a first point on a first part represented in a plurality of tomographic images of an organ;
    determining a relative position of the first point with respect to a reference position of the first part represented in the plurality of tomographic images and a reference position of a second part represented in the plurality of tomographic images;
    setting a second point in association with the first point, on a first part in a 3D model representing a structure of the organ, such that a relative position of the second point with respect to a reference position of the first part in the 3D model and a reference position of a second part in the 3D model matches the relative position of the first point; and
    deforming the 3D model such that, when the plurality of tomographic images and the 3D model are placed in a same coordinate system, a position of the second point matches a position of the first point corresponding to the second point.

2. The computer-readable storage medium according to claim 1, wherein:
    the determining includes representing the relative position of the first point in terms of an angle formed by a line connecting the reference position of the first part represented in the plurality of tomographic images and the reference position of the second part represented in the plurality of tomographic images and a line connecting the reference position of the first part and the first point; and
    the setting a second point includes setting the second point corresponding to the first point, at a position on the first part in the 3D model, such that an angle formed by a line connecting the reference position of the first part in the 3D model and the reference position of the second part in the 3D model and a line connecting the reference position of the first part in the 3D model and the second point is equal to the angle representing the relative position of the first point.

3. The computer-readable storage medium according to claim 1, wherein:
    the setting a first point includes
        setting a plurality of first points;
    the determining includes
        selecting one of the plurality of first points that is the closest to the second part represented in the plurality of tomographic images, and
        determining a relative position of the selected first point; and
    the setting a second point includes
        setting a second point in association with the selected first point, such that a relative position of the second point with respect to the reference position of the first part in the 3D model and the reference position of the second part in the 3D model matches a relative position of the selected first point, and
        setting second points corresponding to the respective first points that are not selected, on the first part in the 3D model, such that a spacing ratio between the second points is equal to a spacing ratio between the first points.

4. The computer-readable storage medium according to claim 3, wherein the selecting includes:

calculating a line that represents the first part, on the basis of the plurality of first points;
detecting a point on the line that is the closest to a center of gravity of the second part represented in the plurality of tomographic images; and
selecting one of the first points that is the closest to the detected point.

5. The computer-readable storage medium according to claim 1, wherein:
the determining includes
setting a center of gravity of the first part represented in the plurality of tomographic images as the reference position of the first part therein, and
setting a center of gravity of the second part represented in the plurality of tomographic images as the reference position of the second part therein; and
the setting a second point includes
setting a center of gravity of the first part in the 3D model as the reference position of the first part therein, and
setting a center of gravity of the second part in the 3D model as the reference position of the second part therein.

6. The computer-readable storage medium according to claim 1, wherein the deforming includes:
comparing the first part in the 3D model with an image of the first part represented in the plurality of tomographic images; and
modifying a shape of the first part in the 3D model such that a contour of the first part in the 3D model matches a position in the image at which a luminance change rate is greater than that in a surrounding area thereof.

7. The computer-readable storage medium according to claim 6, wherein the modifying includes modifying the shape of the first part in the 3D model while preventing a second point that has been moved to a position of the corresponding first point from being further moved.

8. The computer-readable storage medium according to claim 1, wherein the organ is a heart, and the first part and the second part are valves of the heart.

9. A model generation method comprising:
setting, by a processor, a first point on a first part represented in a plurality of tomographic images of an organ;
determining, by the processor, a relative position of the first point with respect to a reference position of the first part represented in the plurality of tomographic images and a reference position of a second part represented in the plurality of tomographic images;
setting, by the processor, a second point in association with the first point, on a first part in a 3D model representing a structure of the organ, such that a relative position of the second point with respect to a reference position of the first part in the 3D model and a reference position of a second part in the 3D model matches the relative position of the first point; and
deforming, by the processor, the 3D model such that, when the plurality of tomographic images and the 3D model are placed in a same coordinate system, a position of the second point matches a position of the first point corresponding to the second point.

10. A model generation apparatus comprising:
a processor configured to perform a procedure including:
setting a first point on a first part represented in a plurality of tomographic images of an organ,
determining a relative position of the first point with respect to a reference position of the first part represented in the plurality of tomographic images and a reference position of a second part represented in the plurality of tomographic images,
setting a second point in association with the first point, on a first part in a 3D model representing a structure of the organ, such that a relative position of the second point with respect to a reference position of the first part in the 3D model and a reference position of a second part in the 3D model matches the relative position of the first point, and
deforming the 3D model such that, when the plurality of tomographic images and the 3D model are placed in a same coordinate system, a position of the second point matches a position of the first point corresponding to the second point.

* * * * *